US011075873B2

(12) United States Patent
Gorelik et al.

(10) Patent No.: US 11,075,873 B2
(45) Date of Patent: Jul. 27, 2021

(54) INBOX PAUSE MODE TO FACILITATE FOCUSED USE OF AN EMAIL CLIENT

(71) Applicant: Microsoft Technology Licensing, LLC, Redmond, WA (US)

(72) Inventors: Ilya David Gorelik, Seattle, WA (US); Thomas Constantin, Seattle, WA (US); Suzan Marashi, Seattle, WA (US); Elena Catrinescu, Kirkland, WA (US); Lydia Johanna Utkin, Bellevue, WA (US); Gil Shulman, Seattle, WA (US); Sebastian De La Chica, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 46 days.

(21) Appl. No.: 16/391,111

(22) Filed: Apr. 22, 2019

(65) Prior Publication Data

US 2020/0336452 A1   Oct. 22, 2020

(51) Int. Cl.
  *G06F 15/167* (2006.01)
  *H04L 12/58* (2006.01)
(52) U.S. Cl.
  CPC .............. *H04L 51/22* (2013.01); *H04L 51/26* (2013.01)
(58) Field of Classification Search
  CPC combination set(s) only.
  See application file for complete search history.

(56) References Cited

U.S. PATENT DOCUMENTS

| 8,312,096 | B2 | 11/2012 | Cohen et al. |
| 8,583,949 | B2 | 11/2013 | Belali et al. |
| 8,948,821 | B2 | 2/2015 | Newham et al. |
| 2007/0214221 | A1 | 9/2007 | Reddy et al. |
| 2010/0159995 | A1* | 6/2010 | Stallings ............... G06F 3/0488 |
| | | | 455/566 |
| 2011/0283241 | A1* | 11/2011 | Miller ................... H04W 12/08 |
| | | | 715/863 |

(Continued)

FOREIGN PATENT DOCUMENTS

WO    2016033377 A1    3/2016

OTHER PUBLICATIONS

"Inbox Pause: Eliminate Interruptions, Stop Stress, and Feel Free", Retrieved from: https://web.archive.org/web/20170806011845/https://www.boomeranggmail.com/inboxpause/, Aug. 6, 2017, 3 Pages.

(Continued)

*Primary Examiner* — John B Walsh
*Assistant Examiner* — Stephen J Houlihan
(74) *Attorney, Agent, or Firm* — Thomas M. Hardman; Ray Quinney & Nebeker; Anand Gupta

(57) ABSTRACT

A method for facilitating focused use of an email client includes entering an inbox pause mode and pausing display of at least some new email messages and email notifications while in the inbox pause mode. The method also includes detecting, while in the inbox pause mode, a selection by a user of a previously received email message that was received prior to entering the inbox pause mode. The method also includes displaying, while in the inbox pause mode, information about a subsequently received email message that is received subsequent to entering the inbox pause mode and that belongs to a conversation comprising the previously received email message.

19 Claims, 17 Drawing Sheets

(56) References Cited

U.S. PATENT DOCUMENTS

| | | | | |
|---|---|---|---|---|
| 2012/0117169 | A1* | 5/2012 | Plotkin | H04L 51/36 709/206 |
| 2013/0040629 | A1* | 2/2013 | Sprigg | H04N 21/6543 455/419 |
| 2015/0188875 | A1* | 7/2015 | Sharp | H04M 1/72552 715/752 |
| 2015/0350143 | A1* | 12/2015 | Yang | G06F 3/0482 345/173 |
| 2016/0349984 | A1* | 12/2016 | Ding | G06F 3/04883 |
| 2017/0063772 | A1* | 3/2017 | Bapat | G06F 21/604 |
| 2017/0076293 | A1* | 3/2017 | Cage | H04L 63/0853 |
| 2019/0116144 | A1* | 4/2019 | Ghotbi | G06F 16/345 |

OTHER PUBLICATIONS

"Inbox When Ready for Gmail and Inbox by Gmail", Retrieved from: https://web.archive.org/web/20190226175534/ hittps://inboxwhenready.org/, Feb. 26, 2019, 4 Pages.

Assaraf, Naomi, "Free: Pause Gmail Inbox and Be More Productive", Retrieved from: https://blog.cloudhq.net/pause-gmail-inbox/, Jun. 13, 2018, 8 Pages.

Moore, Alex, "New in Boomerang: Fight Email Overload with Inbox Pause", Retrieved from: https://blog.boomerangapp.com/2017/08/new-in-boomerang-fight-email-overload-with-inbox-pause/, Aug. 3, 2017, 5 Pages.

Studen, Ilija, "Smarter Notifications—Blog—ActiveCollab", Retrieved from: https://activecollab.com/blog/design/smarter-notifications, Feb. 2, 2015, 8 Pages.

"International Search Report & Written Opinion Issued in PCT Application No. PCT/US20/025573", dated Jul. 10, 2020, 11 Pages.

* cited by examiner

INBOX PAUSE MODE TO FACILITATE FOCUSED USE OF AN EMAIL CLIENT

CROSS-REFERENCE TO RELATED APPLICATIONS

N/A

BACKGROUND

Electronic mail, or email, is a method of exchanging messages between people using electronic devices. In addition to being used on desktop computers, email is also widely used on other types of computing devices such as laptop computers, smartphones, tablet computers, and smartwatches. This makes it possible for people to send and receive email messages almost anywhere.

Software programs for retrieving, reading, and managing email are generally referred to as email clients. An email client may be configured to send and receive email for a particular email address (e.g., username@domain.com) associated with a user. Email messages that are sent to the user's email address may initially be delivered to an email server, which notifies the email client about the new email messages. The email client may download the content of the email messages from the email server.

Most email clients allow email to be organized into electronic folders. New email messages are typically displayed in a folder that is referred to as an inbox. A new email message may remain in the user's inbox until the user takes some action in connection with the email, such as deleting the email message or moving the email message to another folder.

Email is an important part of life for many people. A typical worker in a professional office environment sends and receives a large number of email messages every day and spends a significant percentage of the work day managing email messages. Many people also send personal email messages to friends and family members.

It is easy for people to become distracted by incoming email messages. For example, consider a scenario in which a user of a computing device wants to spend time performing a task (e.g., preparing a document). As the user begins to perform the task, suppose that the user receives several new email messages. Instead of continuing to work on the task, the user may instead become distracted and spend time reading and responding to those new email messages. Moreover, the user may find that reading and responding to those new email messages leads to other activities (e.g., sending other email messages, participating in telephone calls or meetings) that take even more time away from the original task. At the end of the day, the user may find that he or she has made very little progress with respect to the original task. When large numbers of emails are received on a regular basis, the distractions caused by new email messages can greatly affect productivity.

To avoid becoming distracted by incoming email messages while performing a task, one potential solution would be for the user to close the email client altogether so that the user is not notified when new email messages are received. However, this is not a satisfactory solution to the problem because the user may need to access the email client in connection with performing the task. For example, the user may need to find a particular email message (or send an email message to request information) in connection with performing the task. The user may also need to access other information (e.g., calendar information) that is maintained by the email client in connection with performing the task.

In some situations, the task that the user wants to perform may directly involve the email client. For example, the task may involve reading and/or responding to existing email messages. As another example, the task may involve performing email "triage," or in other words, processing email messages in the user's inbox by categorizing and prioritizing them. Email triage can be a useful technique for people who receive large numbers (e.g., hundreds or even thousands) of email messages on a daily basis. It is, however, easy to become distracted by incoming email messages while performing email triage, which limits the effectiveness of performing email triage in the first place.

Some known email clients have a "work offline" mode in which the email client does not display any new email messages or email notifications. While operating in the work offline mode prevents distractions from new email messages, one disadvantage is that the email client is unable to send email messages while operating in this mode. Thus, the user is unable to respond to existing email messages when the email client is operating in work offline mode. Another disadvantage of the work offline mode is that the user may miss out on information in new email messages that would be important to the user.

SUMMARY

In accordance with one aspect of the present disclosure, a method for facilitating focused use of an email client is disclosed. The method includes entering an inbox pause mode and pausing display of at least some new email messages and email notifications while in the inbox pause mode. The method also includes detecting, while in the inbox pause mode, a selection by a user of a previously received email message that was received prior to entering the inbox pause mode. In response, information may be displayed about a subsequently received email message that is received subsequent to entering the inbox pause mode and that belongs to a conversation comprising the previously received email message.

The information about the subsequently received email message may include at least some content from the subsequently received email message. Alternatively, or in addition, the information about the subsequently received email message may include a notification about the subsequently received email message. In some embodiments, the previously received email message may be included in a list of email messages that is displayed in a list pane of a user interface, and the information about the subsequently received email message may be displayed in a reading pane of the user interface.

The method may also include receiving an additional email message after entering the inbox pause mode, determining that the additional email message satisfies a condition for being displayed while the email client is in the inbox pause mode, and displaying the additional email message. In some embodiments, determining that the additional email message satisfies the condition comprises determining that the additional email message is related to a project on which the user is currently working. In some embodiments, determining that the additional email message satisfies the condition comprises determining that the additional email message is associated with an urgent priority level. In some embodiments, determining that the additional email message satisfies the condition comprises determining that a sender of the additional email message is included in a favorites list.

In some embodiments, determining that the additional email message satisfies the condition comprises determining that the additional email message was initially received prior to entering the inbox pause mode and then scheduled to be redelivered at a time that occurs subsequent to entering the inbox pause mode.

The method may also include receiving user input comprising search criteria and displaying an email message that was received subsequent to entering the inbox pause mode and that satisfies the search criteria.

The method may also include causing the email client to send an email message while in the inbox pause mode. The method may also include causing the email client to display a calendar notification while in the inbox pause mode. The method may also include causing the email client to display an indication of a subset of a plurality of email messages in the user's inbox that are likely to be important to the user.

The inbox pause mode may be entered in response to user input. The method may also include causing the email client to automatically exit the inbox pause mode after a predefined time period.

The method may also include displaying, in response to exiting the inbox pause mode, a plurality of additional email messages that were received subsequent to entering the inbox pause mode and displaying an indication of a subset of the plurality of additional email messages that are likely to be important to the user.

The method may also include causing the email client to display a suggestion to enter the inbox pause mode.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which:

FIG. 2 illustrates an example showing how the user may be notified about an email message that is received after the email client has been placed in the inbox pause mode in a user interface that does not include a reading pane.

DETAILED DESCRIPTION

Figure 1A:
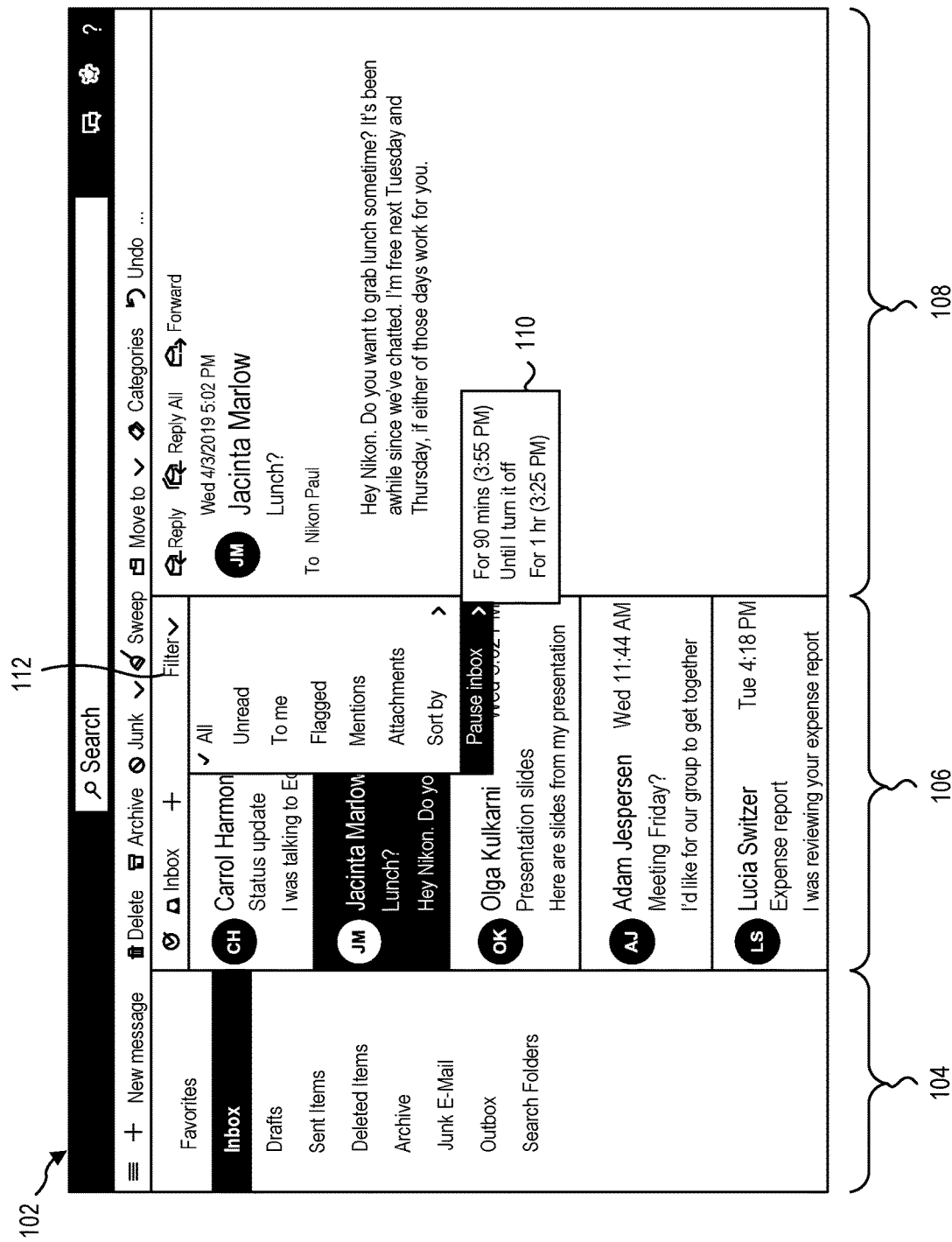
FIG. 1A illustrates an example showing one way that a user of an email client may provide user input to cause the email client to enter an inbox pause mode.

The present disclosure is generally related to enabling a user of a computing device to focus on a task without becoming distracted by new email messages. Advantageously, the techniques disclosed herein prevent such distractions while still allowing access to and use of an email client. Thus, the techniques disclosed herein facilitate focused use of an email client.

In accordance with the present disclosure, an email client may be configured to operate in an inbox pause mode. While operating in the inbox pause mode, the email client pauses the display of most new email messages and email notifications. New email messages continue to be delivered to the email server as they normally would be, and the email client may still continue to receive notifications from the email server about the new email messages. But the email client does not immediately display most new email messages or notifications about new email messages while in the inbox pause mode.

An email client may enter the inbox pause mode in response to user input. The user may decide to place the email client in the inbox pause mode so that the user can focus on a task. By placing the client in the inbox pause mode, the user is able to focus on the task without becoming distracted by new email messages. Advantageously, the inbox pause mode enables the user to eliminate the distractions associated with incoming email messages while still allowing the user to access and use the email client. This can be important, because the task that the user wants to perform may involve using the computing device on which the email client is running (e.g., using a word processing application that is running on the computing device to prepare a document) or even using the email client itself (e.g., performing email triage, responding to existing email messages, sending new email messages, looking up events on a calendar that the email client maintains). The email client may be used to send email messages while operating in the inbox pause mode. Calendar notifications may also be displayed while operating in the inbox pause mode.

The techniques disclosed herein also allow the user to be informed about new email messages under some circumstances, so that the user does not miss out on information that would be important to the user while the email client is operating in the inbox pause mode. Consider a scenario in which the user enters inbox pause mode in order to focus on reading and/or responding to existing email messages without being distracted by new email messages. Suppose that, after entering the inbox pause mode, the user receives another email message that belongs to the same conversation as a previously received email message. For example, a previously received email message may have been addressed to a group of people, and another person in the group may have replied to the email message after the user entered the inbox pause mode. In accordance with the present disclosure, information about that subsequently received email message may be displayed to the user in response to the user selecting the previously received email message. This ensures that the user does not miss out on important information related to the conversation and thereby make an embarrassing mistake, such as replying to an old email.

There may be other situations in which an email client may display information about new email messages while operating in the inbox pause mode. Some examples of new email messages that may be displayed even while the email client is operating in the inbox pause mode include a new email message that is associated with an urgent priority level, a new email message that is sent by someone in a favorites list, and a new email message that is related to a project on which the user is currently working.

In another example, while the email client is in the inbox pause mode, the user may search for email messages that satisfy certain criteria. The email messages that are displayed in the search results may include any email messages that have been received that satisfy the search criteria, including any emails that have been received after entering the inbox pause mode.

In yet another example, the email client may be configured to implement a "snooze" feature in which the user can cause a particular email message to temporarily disappear and then reappear in the user's inbox at a subsequent time. Suppose the user "snoozes" an email message while the email client is in a normal mode of operation (i.e., not in the inbox pause mode) and schedules the email message to be redelivered at a subsequent time. If the email client is in the inbox pause mode at the time when the email message is scheduled to be redelivered, information about that email message may be displayed even though the email client is in the inbox pause mode.

As noted above, an email client may enter the inbox pause mode in response to user input. When the user places an email client in the inbox pause mode, the user may be given the option to enter the inbox pause mode for a predefined time period (e.g., one hour). If the user chooses to enter the inbox pause mode for a predefined time period, the email client may automatically (without additional user input) exit the inbox pause mode after the predefined time period has elapsed. When the email client exits the inbox pause mode, the email client may start displaying new email messages and email notifications again.

In some embodiments, the email client may provide suggestions regarding when it might be a good time to enter the inbox pause mode and/or when it might be a good time to exit the inbox pause mode. The decision to present these kinds of suggestions to the user may be based on factors such as how many email messages are in the user's inbox, whether the user currently has something scheduled on his or her calendar, how many items are included on the user's to-do list, and so forth. Machine learning techniques may be utilized to determine when to make a suggestion to enter the inbox pause mode and/or to exit the inbox pause mode.

As noted above, a user may choose to enter the inbox pause mode in order to perform email triage. If the user's inbox includes a large number of emails, this can be a daunting task, especially if the user only has a small time period available for performing email triage. To help the user make the most of whatever amount of time she or he has available, a determination may be made about which email messages in the user's inbox are likely to be most important to the user. In other words, a subset of the email messages in the user's inbox may be identified, where this subset includes those email messages that are likely to be most important to the user. When the email client enters the inbox pause mode, information may be displayed to the user identifying that subset of emails. For example, the email messages in the subset may be moved to the top of the user's inbox, regardless of when those email messages were actually received.

A similar technique may be utilized when exiting the inbox pause mode. When the email client exits the inbox pause mode and returns to a normal mode of operation, all of the email messages that were received while the email client was in the inbox pause mode may be displayed in the user's inbox. If the user received a large number of email messages while the email client was in the inbox pause mode, seeing a large number of email messages suddenly appear in the user's inbox can make the user feel overwhelmed. To help the user deal with all of these newly received email messages most effectively, a determination may be made about which of the newly received email messages are most likely to be important to the user. In other words, a subset of the new email messages that were received while the email client was in the inbox pause mode may be identified, where this subset includes those email messages that are likely to be most important to the user. When the email client exits the inbox pause mode, information may be displayed to the user identifying that subset of emails. For example, the email messages in the subset may be moved to the top of the user's inbox, regardless of when those email messages were actually received.

In the discussion that follows, the techniques disclosed herein will be described in relation to the behavior of an email client. However, the techniques disclosed herein may also involve, at least to some extent, modifications to an email server. For example, when an email client enters the inbox pause mode, the email client may notify the email server about this change. The email server may keep track of the state of the email client (e.g., which messages are in the user's inbox, which messages are unread) at the time that the email client changes to the inbox pause mode.

In an example, the term "email client" refers to any software program that allows a user to send, receive, and read email messages. In some embodiments, an email client may facilitate web-based email. In other words, an email client may include one or more components that allow users to send, receive, and read email messages via a web interface. Alternatively, in some embodiments, an email client may be a software application.

Advantageously, the techniques disclosed herein may be implemented without creating one or more extra, unnecessary folders within the email client. Instead, in at least some embodiments, an inbox pause mode in accordance with the present disclosure may be implemented using one or more native components of the email client itself. This allows an inbox pause mode to provide more sophisticated tools for determining whether or not the user should be informed about new email messages that are received while in the inbox pause mode.

FIGS. 1A-M illustrate examples of various aspects of a user interface 102 of an email client that implements an inbox pause mode in accordance with the present disclosure. The user interface 102 includes three different sections, which may be referred to as panes. These panes include a folder pane 104, a list pane 106, and a reading pane 108.

The specific details of the examples shown in FIGS. 1A-M should not be interpreted as limiting the scope of the present disclosure. Those skilled in the art will recognize that various changes could be made to these examples in keeping with the inventive principles disclosed herein. For instance, although these examples will be described in relation to a user interface 102 that includes a folder pane 104, a list pane 106, and a reading pane 108, in alternative embodiments the user interface may be configured differently (e.g., without a reading pane 108). Also, although the examples shown in FIGS. 1A-M will be described in relation to specific types of user interface elements (e.g., drop-down menus, buttons, pop-up windows), those skilled in the art will recognize that an inbox pause mode in accordance with the present disclosure may be implemented using different types of user interface elements.

As noted above, an email client may allow email messages to be organized into electronic folders. The folder pane 104 includes a list of these electronic folders. The inbox is included among these electronic folders. Whenever a new email message is received, the new email message is placed in the inbox. The new email message stays in the inbox until the user takes some action to move it out of the inbox (e.g., deleting the email message, moving the email message to a different folder).

The list pane 106 shows a list of the email messages that are included in the folder that is currently selected in the folder pane 104. If the currently selected folder is the inbox, then the email messages that are shown in the list pane 106 are the email messages that are currently in the user's inbox. Because the list pane 106 only includes a list of email messages, only some of the information associated with those email messages (e.g., the sender's name, the subject line, the first few words in the body of the email message) is shown in the list pane 106.

The reading pane 108 shows at least some of the content of the email message that is currently selected in the list pane 106. The reading pane 108 may also include at least some of the content of other email messages that are included in the same conversation as the currently selected email message. In this context, the term "conversation" refers to an email message and any replies to that email message.

The email client may enter the inbox pause mode in response to user input. FIG. 1A illustrates one way that a user of the email client may provide the user input that causes the email client to enter the inbox pause mode. In the depicted example, the option to enter the inbox pause mode appears in a drop-down menu 110. The user may access the drop-down menu 110 by selecting a filter option 112. In an alternative embodiment, the option to enter the inbox pause mode may be presented to the user via a different type of user interface element.

The user may choose between entering the inbox pause mode for an unspecified time period, for a predefined time period (e.g., 30 minutes), or until a specific time (e.g., until 2:30 p.m.). If the user chooses to enter the inbox pause mode for an unspecified time period, then the email client remains in the inbox pause mode until the user provides additional user input that causes the email client to exit the inbox pause mode. If the user chooses to enter the inbox pause mode for a predefined time period, then the email client may automatically (without additional user input) exit the inbox pause mode after the predefined time period has elapsed. If the user chooses to enter the inbox pause mode until a specific time, then the email client may automatically (without additional user input) exit the inbox pause mode after the specific time has been reached.

Figure 1B:
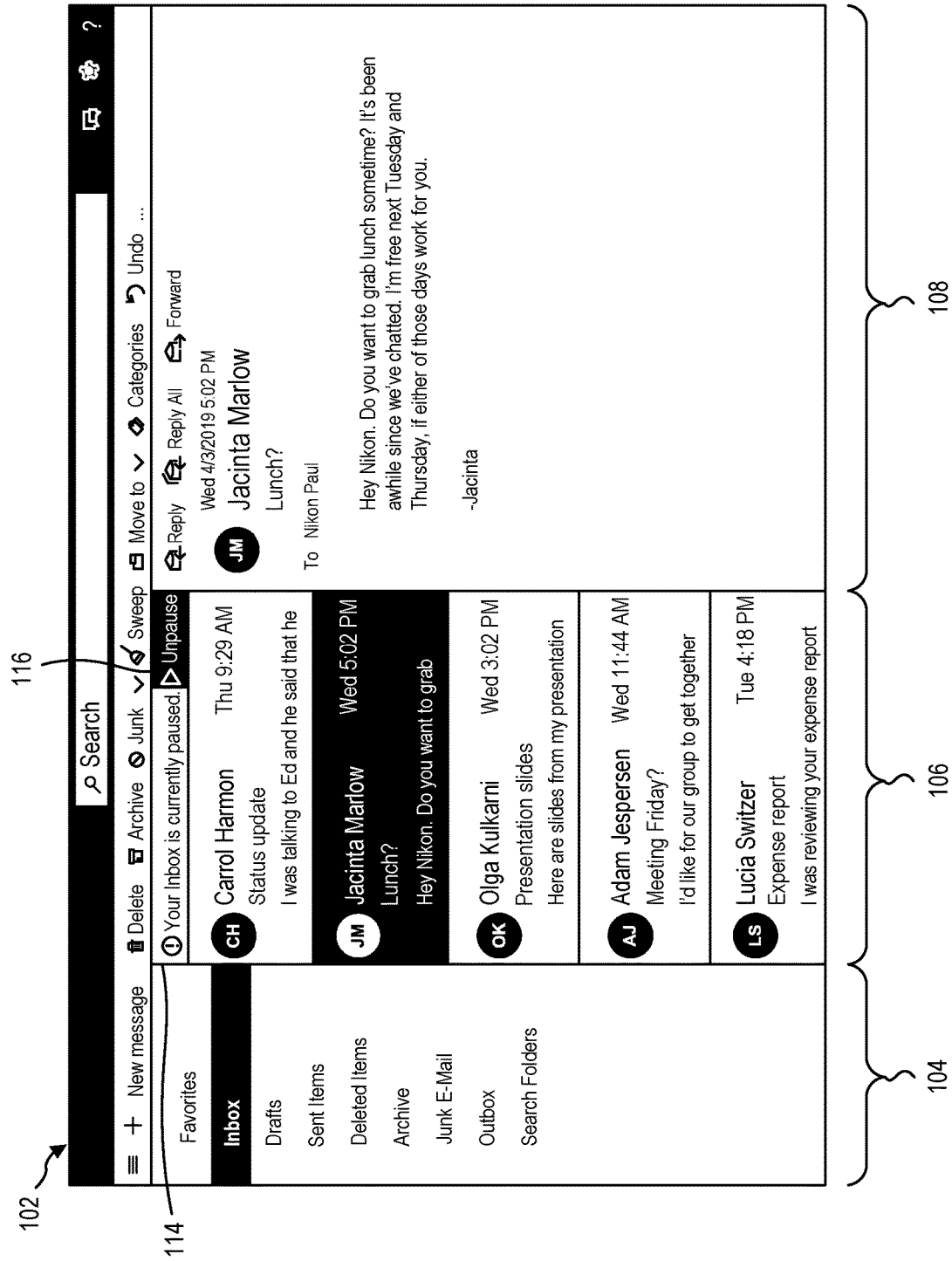
FIG. 1B illustrates an example of a user interface after the email client has entered the inbox pause mode.

FIG. 1B illustrates the user interface 102 after the email client has entered the inbox pause mode. A notification 114 that the email client is currently in the inbox pause mode is prominently displayed in the user interface 102. A button 116 that allows the user to turn off the inbox pause mode is also displayed. This button 116 may be referred to herein as a deactivation button 116. Displaying the notification 114 and/or the deactivation button 116 may be beneficial because displaying these items minimizes the likelihood that the email client will operate in the inbox pause mode without the user being aware of it.

In some embodiments, the notification 114 and/or the deactivation button 116 may be displayed in a color that is different from other colors that are displayed in the user interface 102. For example, if the dominant theme of the user interface 102 is blue, then the notification 114 and/or the deactivation button 116 may be a different color (e.g., red) that is likely to catch the user's attention.

Figure 1C:
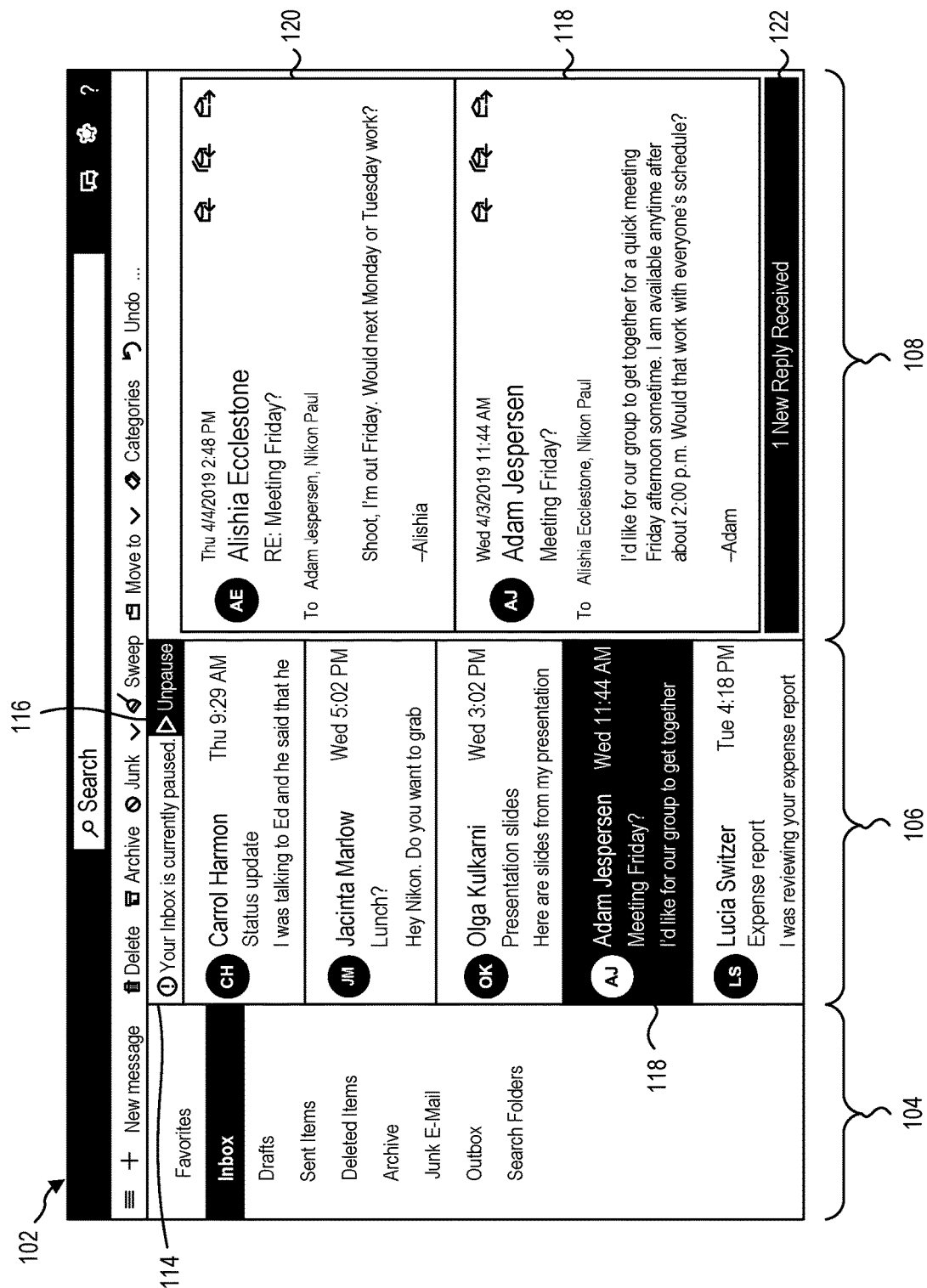
FIG. 1C illustrates one possible scenario in which the user may be notified about an email message that is received after the email client has been placed in the inbox pause mode, namely, when a reply to an existing email message is received after the email client enters the inbox pause mode.

FIG. 1C illustrates one possible scenario in which the user may be notified about an email message 120 that is received after the email client has been placed in the inbox pause mode. In the depicted example, the user receives an email message 118 that is sent to multiple people, including the user. Because this email message 118 is received before the email client enters the inbox pause mode, this email message 118 is included in the list of email messages that is displayed in the list pane 106. After the email client enters the inbox pause mode, another recipient of this email message (i.e., someone other than the user of the email client) replies to the email message 118. Because the reply message 120 is received after the email client has entered the inbox pause mode, the reply message 120 is not included in the list of email messages that is displayed in the list pane 106. When the user selects the email message in the list pane 106, however, at least some of the content of the reply message 120 is displayed in the reading pane 108.

In other words, in response to detecting the user's selection of a previously received email message 118 (i.e., an email message 118 that was received before the email client entered the inbox pause mode), the email client displays information about a subsequently received email message 120 (i.e., an email message that was received after the email client entered the inbox pause mode) that belongs to the same conversation as the previously received email message 118. The information about the subsequently received email message 120 may be displayed automatically (without additional user input) in response to detecting the user's selection of the previously received email message 118.

In the depicted example, the previously received email message 118 is included in a list of email messages that is displayed in the list pane 106, and the user selects the previously received email message 118 in the list pane 106. The information about the subsequently received email message 120 is displayed in the reading pane 108. In addition to showing at least some of the content from the subsequently received email message 120, the reading pane 108 also includes a notification 122 that a new reply to the previously received email message has been received.

Figure 1D:
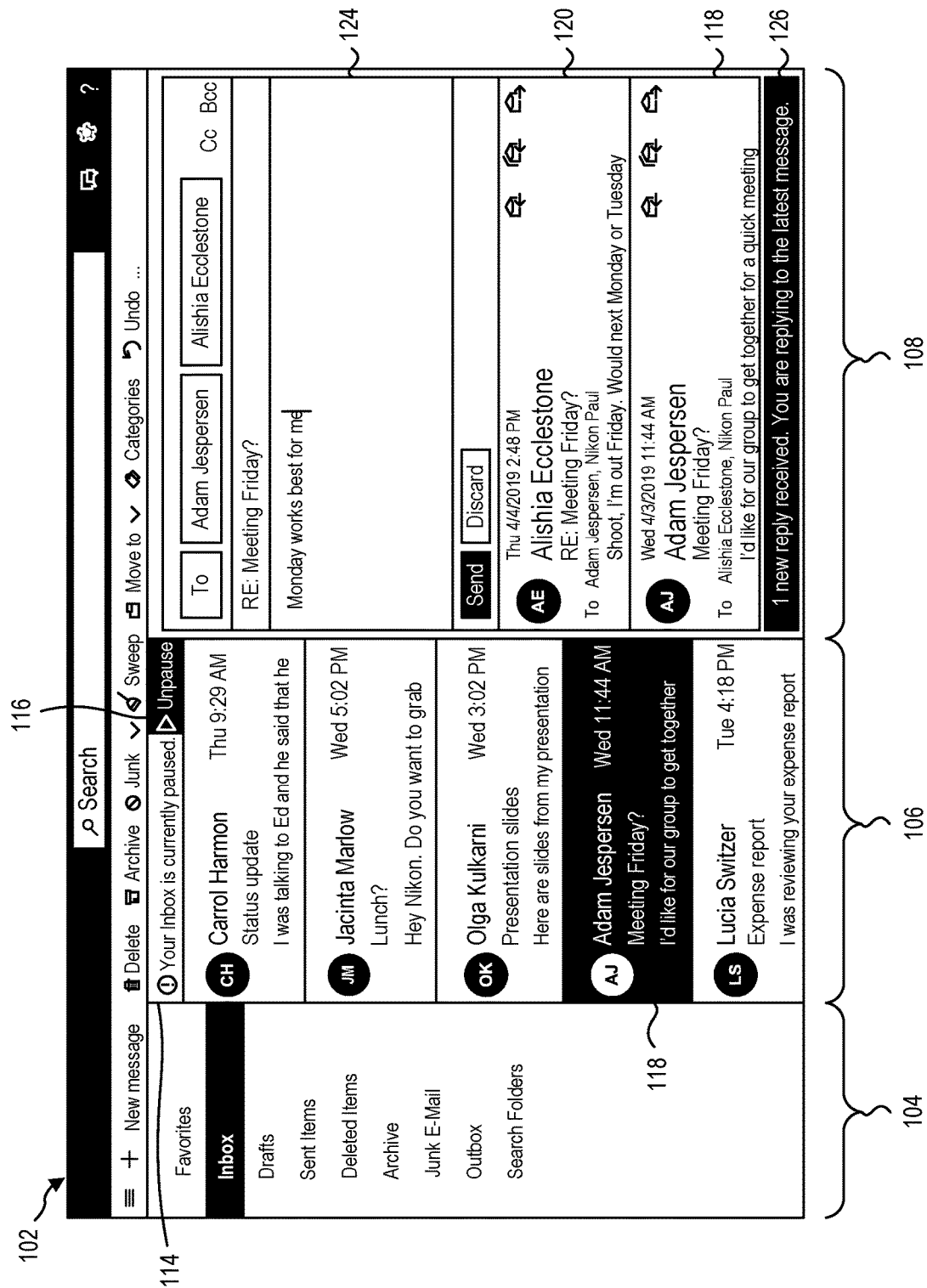
FIG. 1D illustrates an example in which a reply to an existing email message is received after the email client enters the inbox pause mode and the user has started to compose a reply message.

The example shown in FIG. 1D is similar to the example shown in FIG. 1C, except that now the user has started to compose a reply message 124. In addition to showing the reply message 124 that the user is composing, the reading pane 108 also shows some of the content from the subsequently received email message 120. The reading pane 108 also includes a notification 126 indicating that a new reply to the previously received email message 118 has been received and that the user is replying to the latest email message in the conversation. If the user were not replying to the latest email message in the conversation, a notification to that effect could be displayed instead.

In the examples illustrated in FIGS. 1C and 1D, the information about the subsequently received email message 120 includes at least some of the content of the subsequently received email message 120 (e.g., the sender's name, the subject line, at least part of the message body). Alternatively, the information about the subsequently received email message 120 may simply include a notification about the subsequently received email message 120. For example, the email client could notify the user about the subsequently received email message 120 and ask the user whether content from the subsequently received email message 120 should be displayed. In other words, in response to the user selecting the previously received email message 118 in the list pane 106 (and/or in response to detecting the user composing a reply to the previously received email message 118), the content of the previously received email message 118 could be displayed in the reading pane 108 along with a notification that a reply to the previously received email message 118 has been received. The notification could include some type of user interface element (e.g., a button) that, if activated by the user, causes at least some content from the subsequently received email message 120 to be displayed in the reading pane 108.

The examples illustrated in FIGS. 1C and 1D illustrate one possible scenario in which the user may be notified about an email message 120 that is received after the email client has been placed in the inbox pause mode, namely, when a reply 120 to an existing email message 118 is received after the email client enters the inbox pause mode. As noted above, however, there are many other possible scenarios in which the user may be notified about an email message that is received after the email client has been placed in the inbox pause mode. A few of these scenarios are illustrated in FIGS. 1E-M.

Figure 1E:
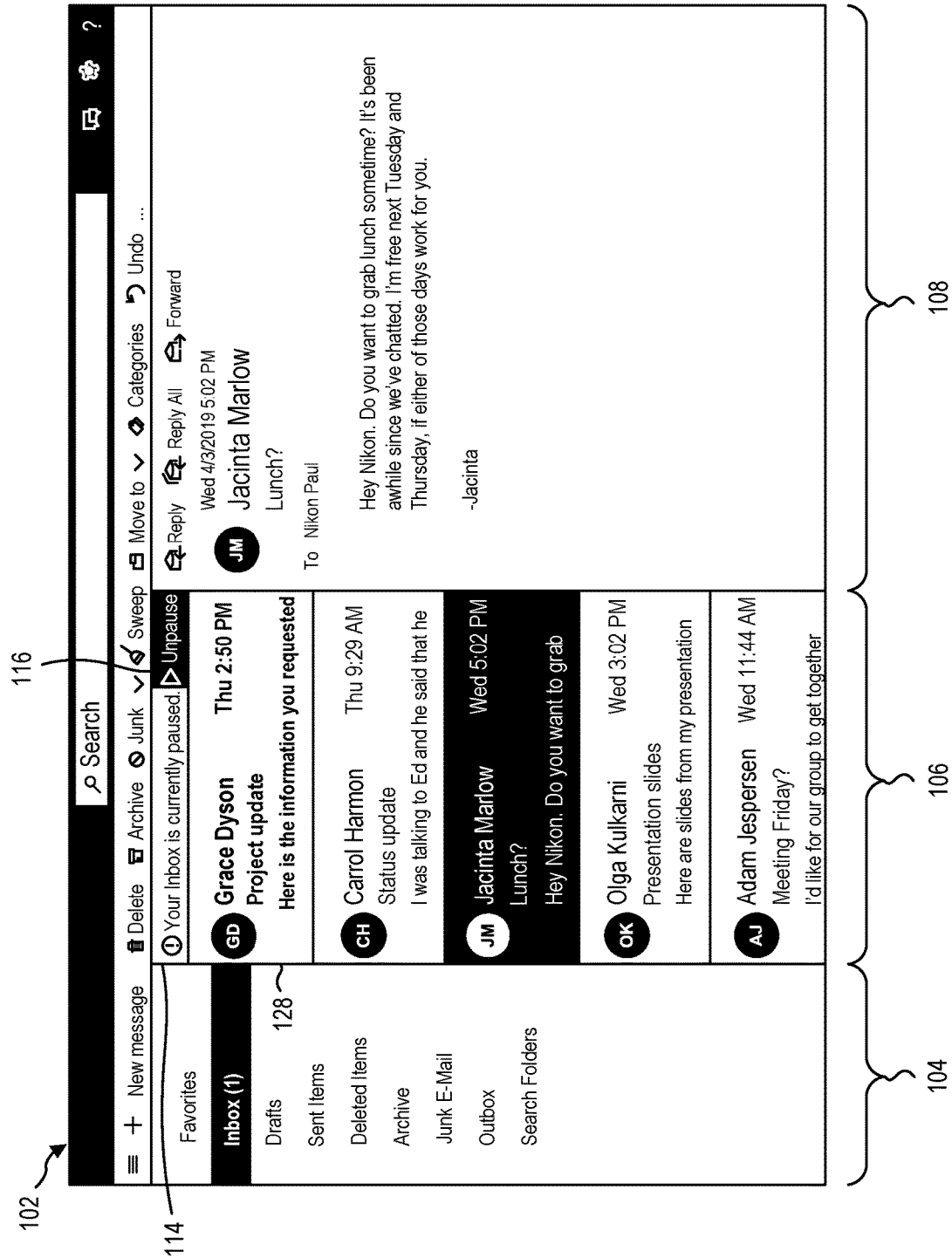
FIG. 1E illustrates an example in which a new email message that is received after the email client enters the inbox pause mode is nonetheless displayed because a determination has been made that the new email message is related to a project on which the user is currently working.

In the example shown in FIG. 1E, a new email message 128 is added to the list of email messages displayed in the list pane 106 because a determination has been made that the new email message 128 is related to a project on which the user is currently working. To make this determination, the email client (and/or a corresponding email server) may analyze the content of the new email message 128 and compare the results of that analysis with other information that is known about projects that the user is currently working on.

Figure 1F:
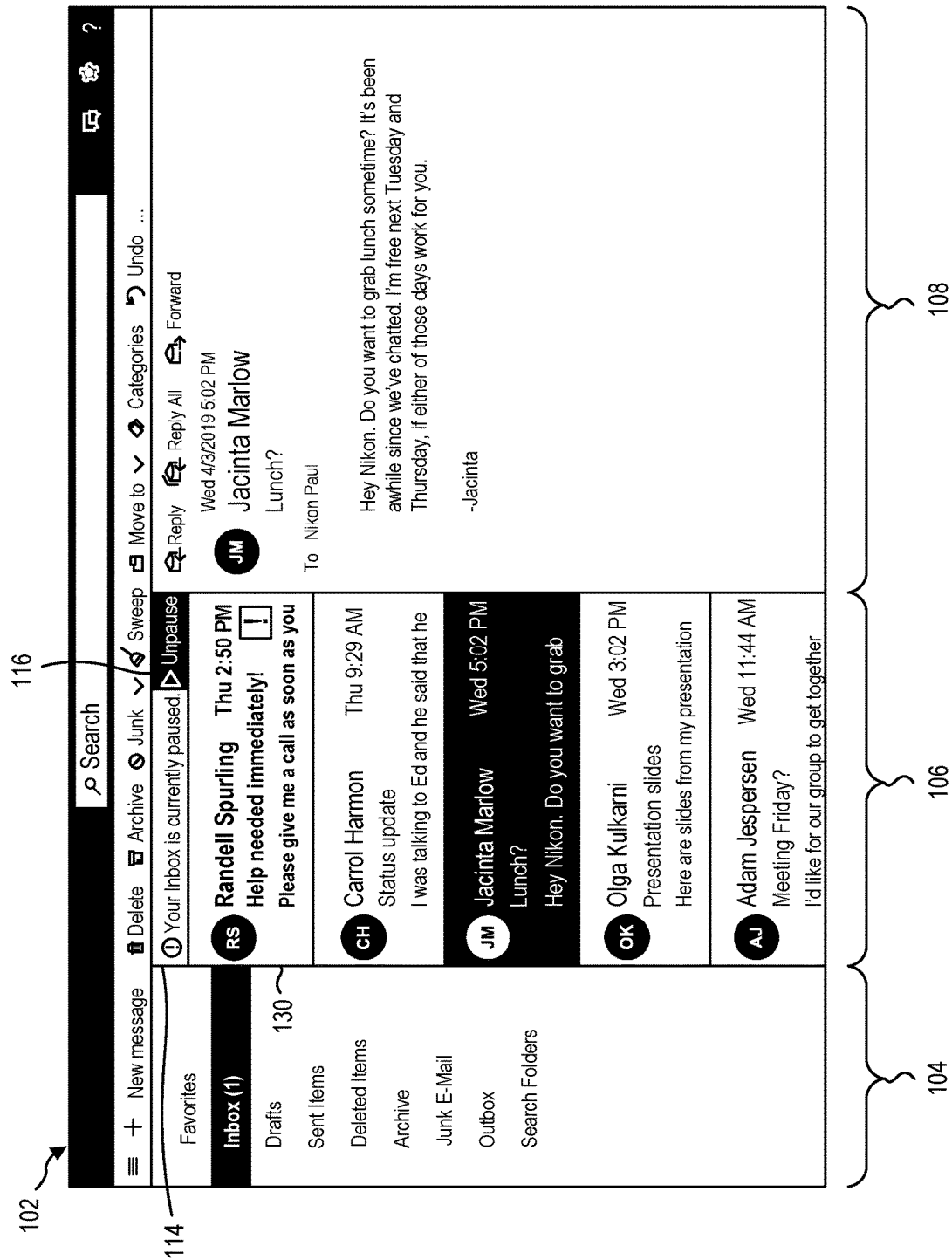
FIG. 1F illustrates an example in which a new email message that is received after the email client enters the inbox pause mode is nonetheless displayed because the email message is associated with an urgent priority level.

In the example shown in FIG. 1F, a new email message 130 is added to the list of email messages displayed in the list pane 106 because the email message is associated with an urgent priority level.

Figure 1G:
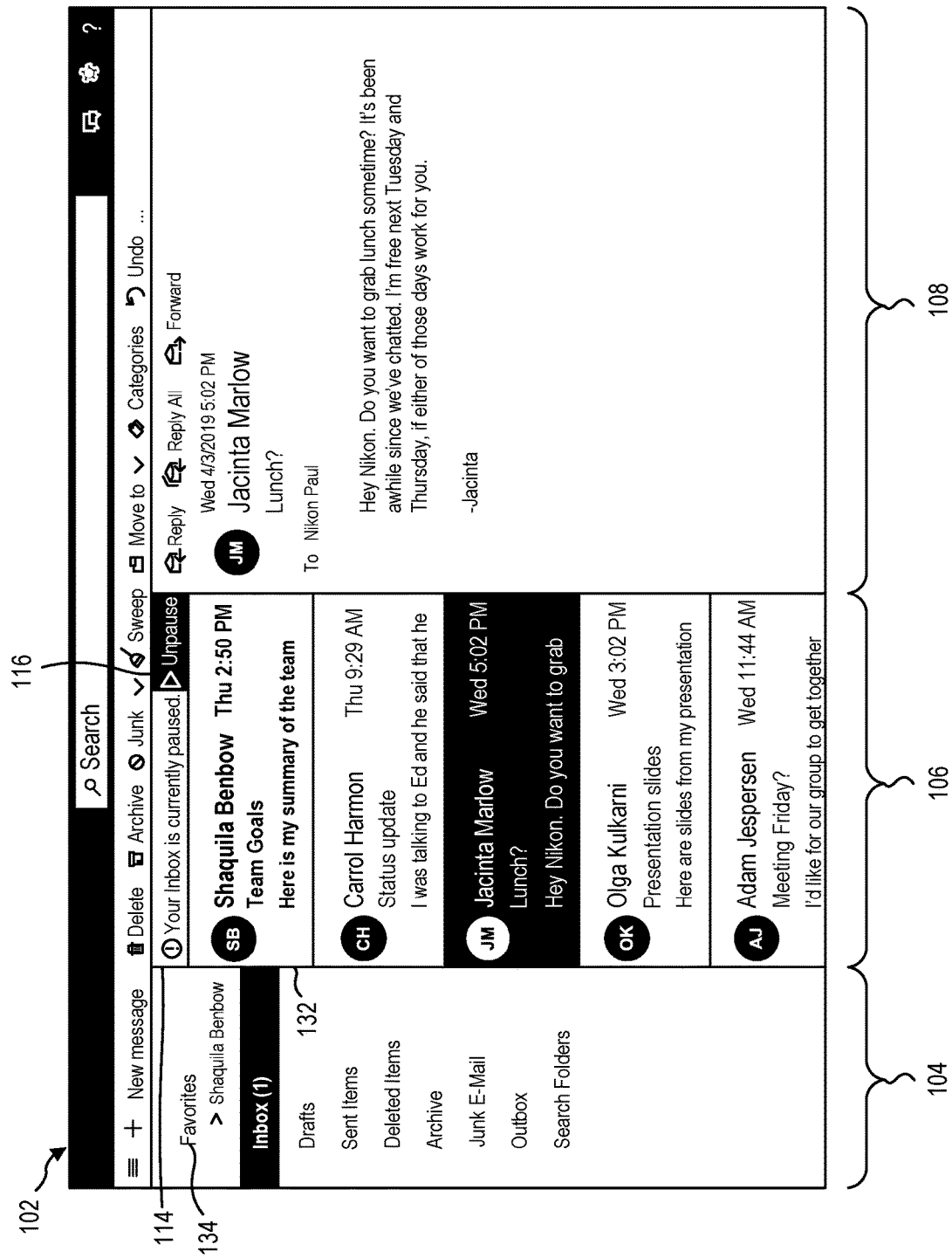
FIG. 1G illustrates an example in which a new email message that is received after the email client enters the inbox pause mode is nonetheless displayed because the sender of the email message is included in a favorites list.

In the example shown in FIG. 1G, the new email message 132 is sent by an individual who is included in a favorites list 134 that is associated with the user's email account. The favorites list 134 may include a set of one or more email addresses whose email messages should always be displayed, even when the email client is operating in the inbox pause mode.

Figure 1H:
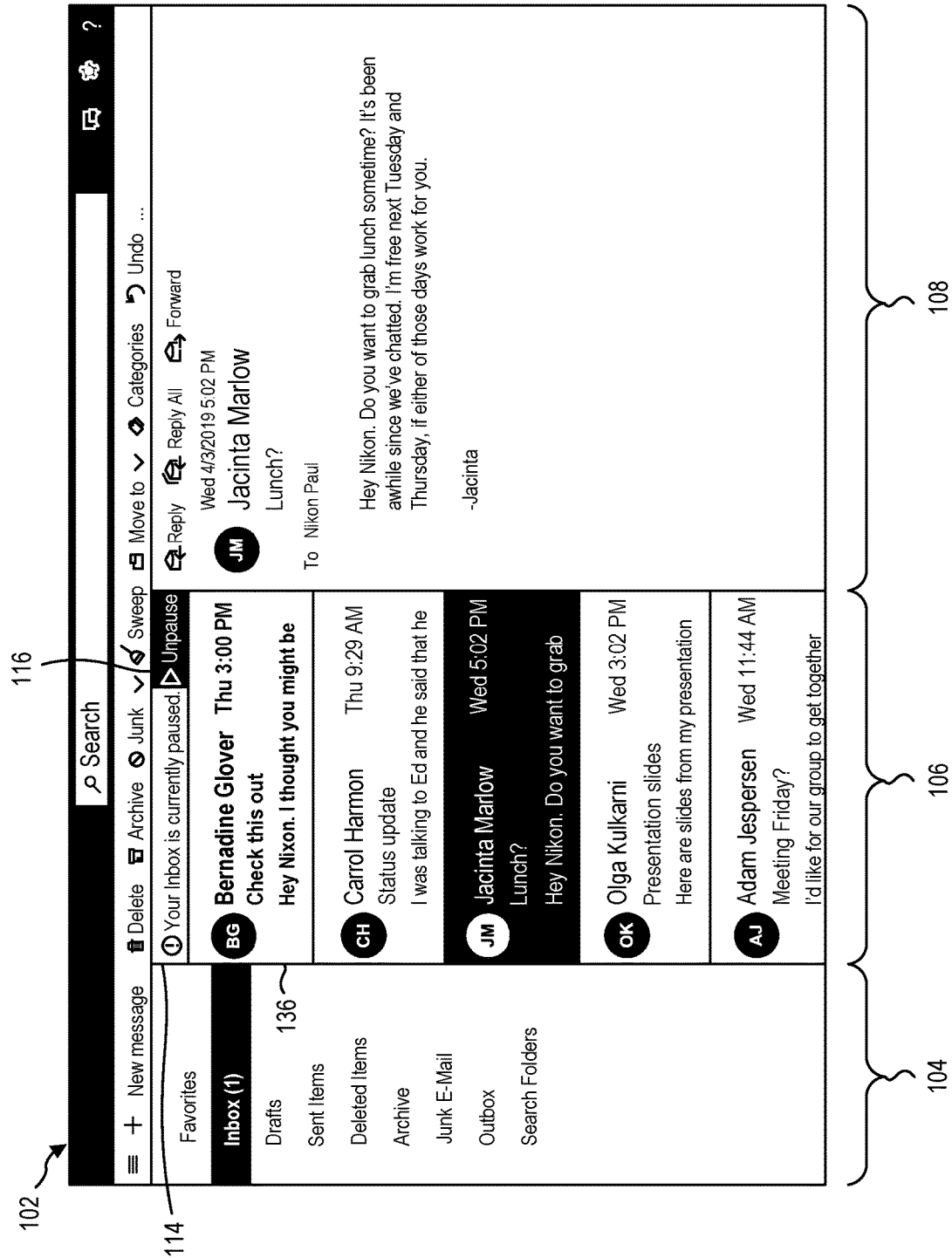
FIG. 1H illustrates an example in which a new email message that is received after the email client enters the inbox pause mode is nonetheless displayed because the email message was previously "snoozed" and scheduled to be redelivered at the current time.

In the example shown in FIG. 1H, a new email message 136 is added to the list of email messages displayed in the list pane 106 because the email message 136 was previously "snoozed" and scheduled to be redelivered at the current time. In other words, the email message 136 was previously received at a point in time before the email client entered the inbox pause mode, and the user scheduled the email message 136 to be redelivered at the current time. Although the email client is operating in the inbox pause mode at the current time, the email client honors the user's request to have the email message 136 reappear in the user's inbox at the current time.

Figure 1I:
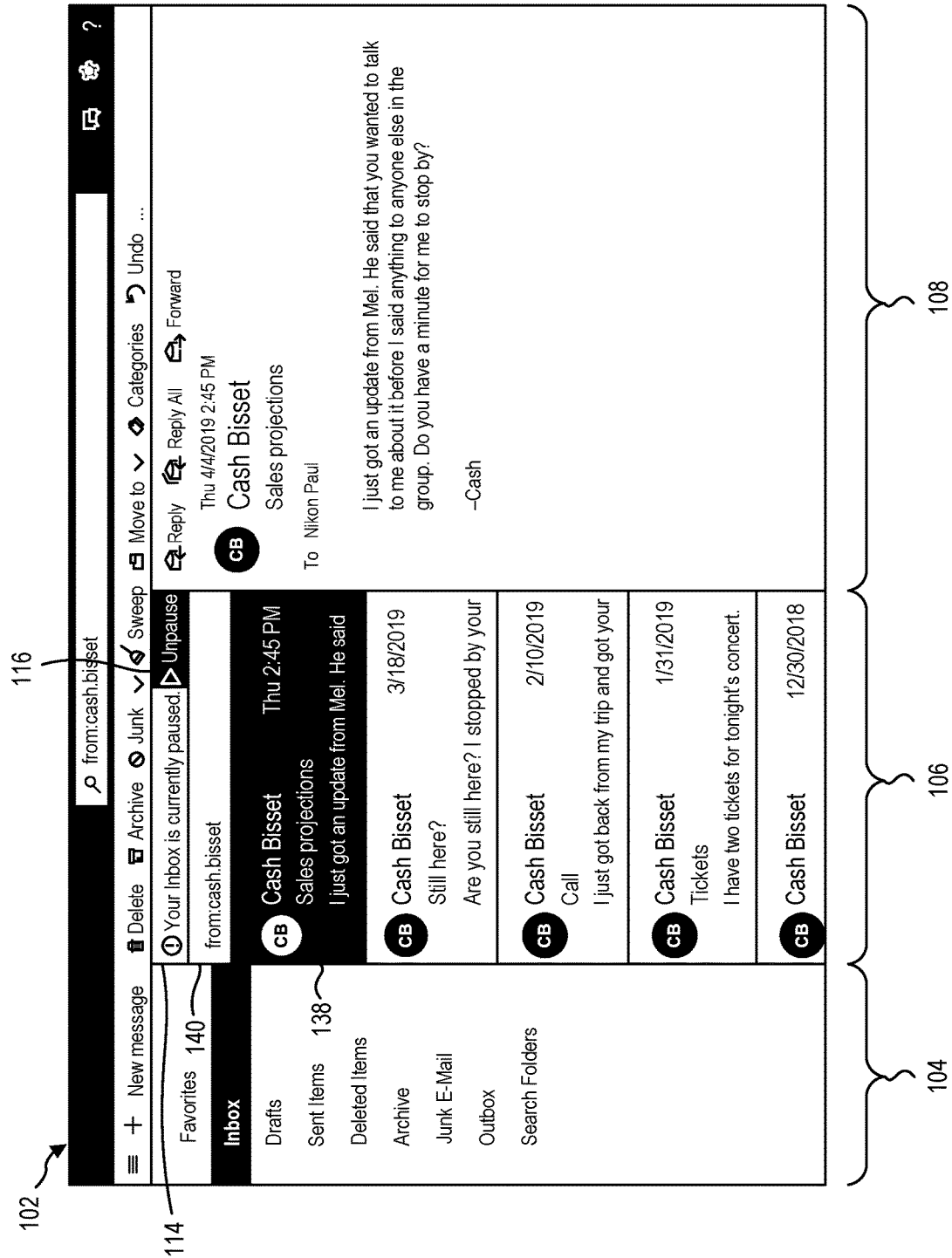
FIG. 1I illustrates another possible scenario in which the user may be notified about an email message that is received after the email client has been placed in the inbox pause mode, namely, when a new email message satisfies user-specified search criteria.

FIG. 1I illustrates another possible scenario in which the user may be notified about an email message that is received after the email client has been placed in the inbox pause mode. In the depicted example, the user searches for email messages that satisfy certain criteria (e.g., email messages from someone whose email address includes the username "cash.bisset") by entering the search criteria in a search bar 140. This search is performed while the email client is in the inbox pause mode. In response, a list of the email messages that satisfy the search criteria are displayed in the list pane 106. An email message 138 that was received subsequent to entering the inbox pause mode is included in the search results.

Figure 1J:
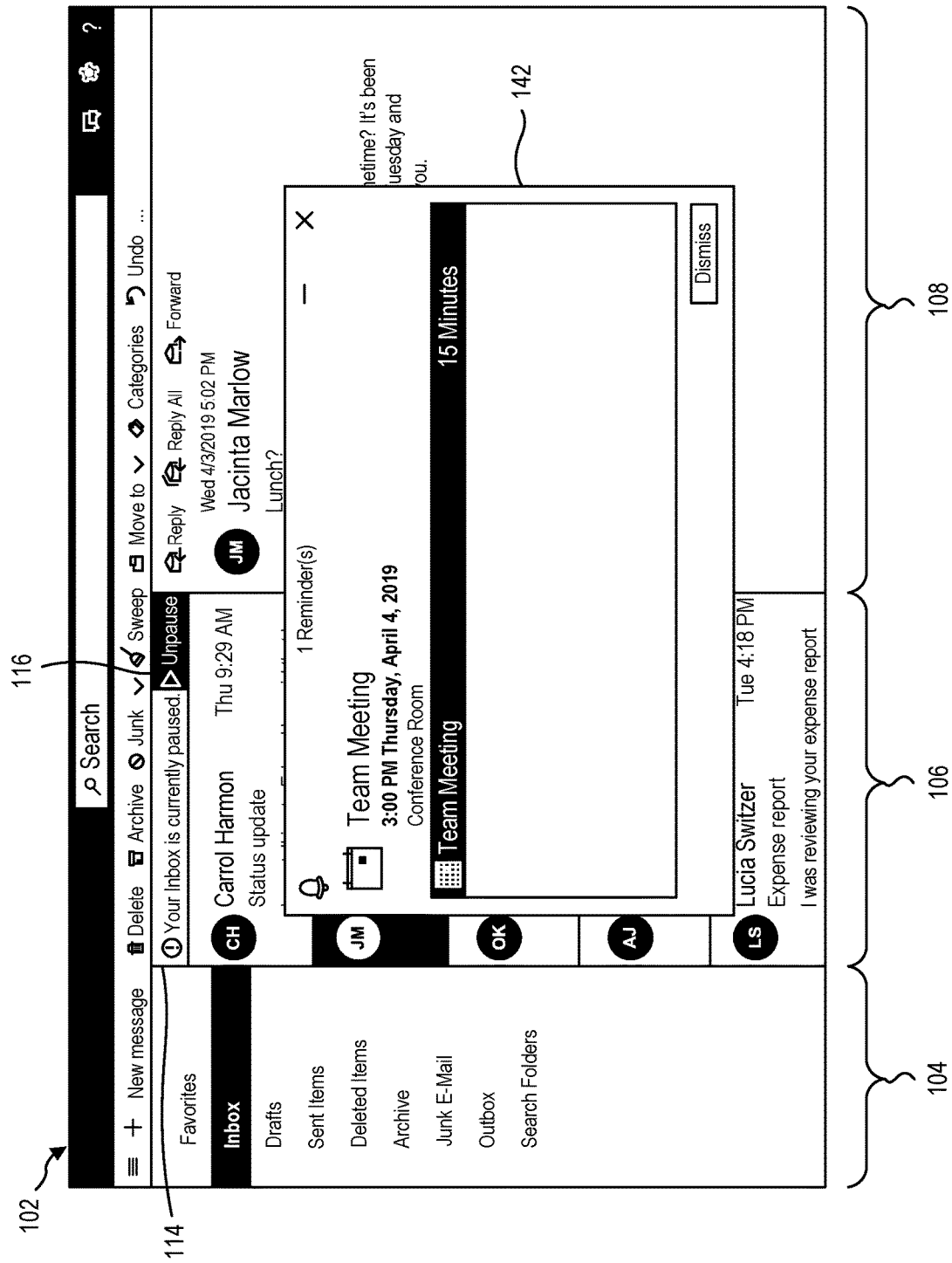
FIG. 1J illustrates a calendar notification being displayed while the email client is in the inbox pause mode.

FIG. 1J illustrates a calendar notification 142 being displayed while the email client is in the inbox pause mode. In the depicted example, the calendar notification 142 may appear as a pop-up window that is displayed in front of the list pane 106 and the reading pane 108.

Figure 1K:
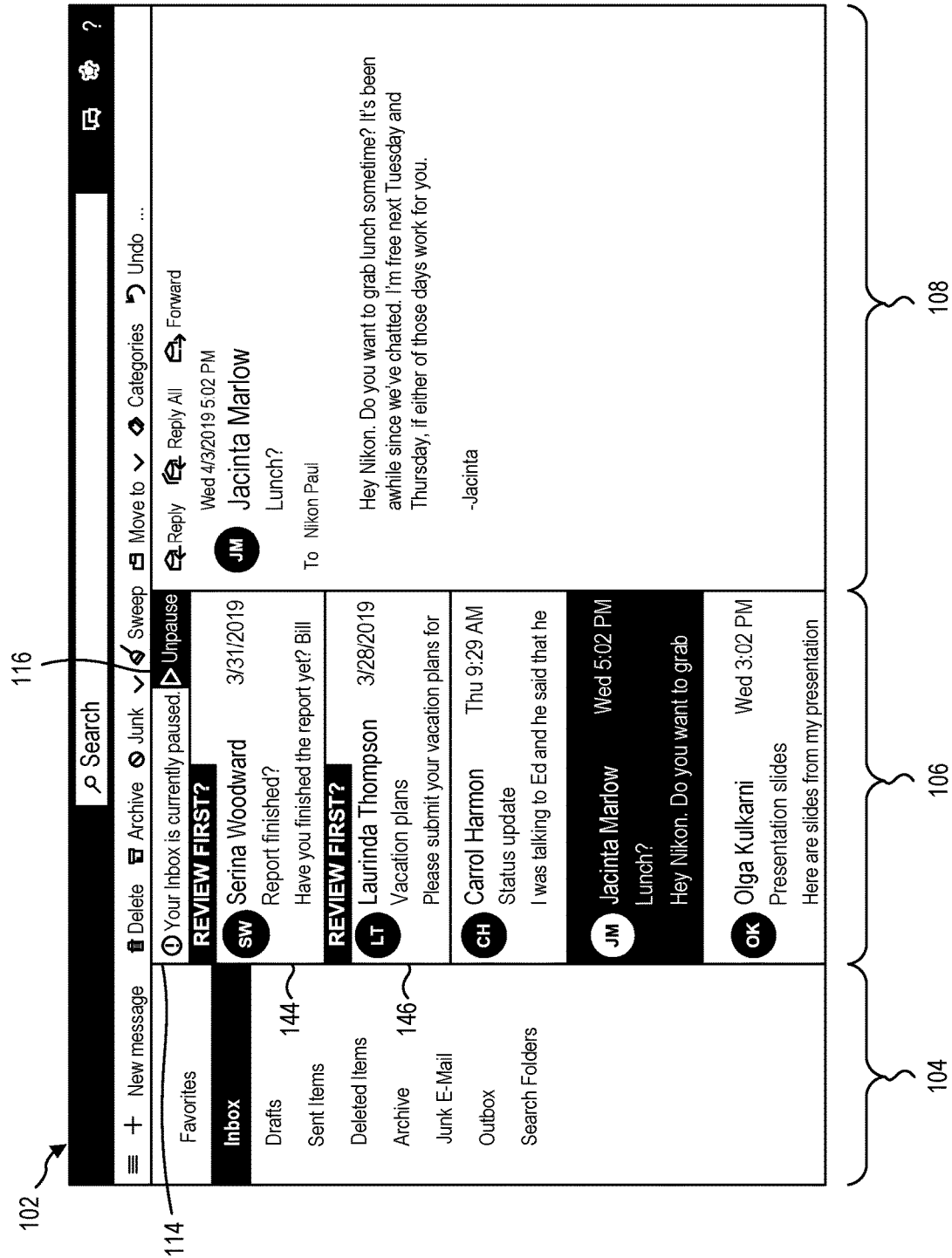
FIG. 1K illustrates an example showing how information may be presented to the user, while the email client is in the inbox pause mode, indicating which of the email messages in the user's inbox have been identified as most likely to be important.

As noted above, when the email client enters the inbox pause mode, a determination may be made about which email messages in the user's inbox are likely to be most important to the user. This may be beneficial, for example, if the user wants to perform email triage while in the inbox pause mode. FIG. 1K illustrates how information may be presented to the user indicating which of the email messages in the user's inbox have been identified as most important.

In the depicted example, two email messages 144, 146 have been identified as potentially important. Even though these email messages 144, 146 were not received most recently, these email messages 144, 146 have been moved to the top of the list of email messages displayed in the list pane 106 and flagged to indicate their potential importance.

Figure 1L:
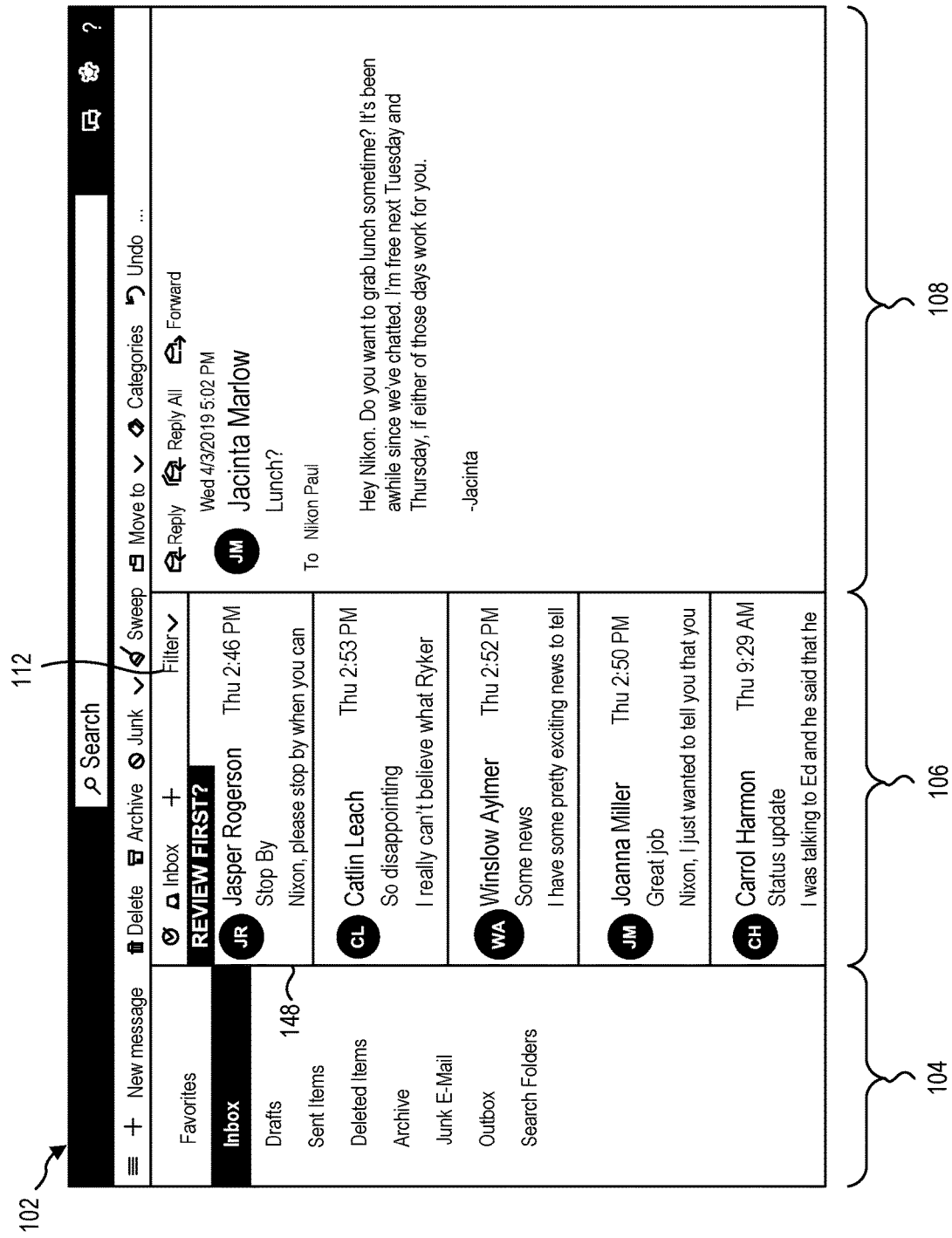
FIG. 1L illustrates an example showing how information may be presented to the user, after the email client has exited the inbox pause mode, indicating which of the newly received email messages in the user's inbox have been identified as most likely to be important.

As also noted above, a similar technique may be utilized when exiting the inbox pause mode. When the email client exits the inbox pause mode and returns to a normal mode of operation, all of the email messages that were received while the email client was in the inbox pause mode may be displayed in the user's inbox. A determination may be made about which of the newly received email messages are most likely to be important to the user. FIG. 1L illustrates how information may be presented to the user indicating which of the newly received email messages have been identified as most important. In the depicted example, one email message 148 has been identified as potentially important. Even though this email message 148 was not received most recently, this email message 148 has been moved to the top of the list of email messages displayed in the list pane 106 and flagged to indicate its potential importance.

Figure 1M:
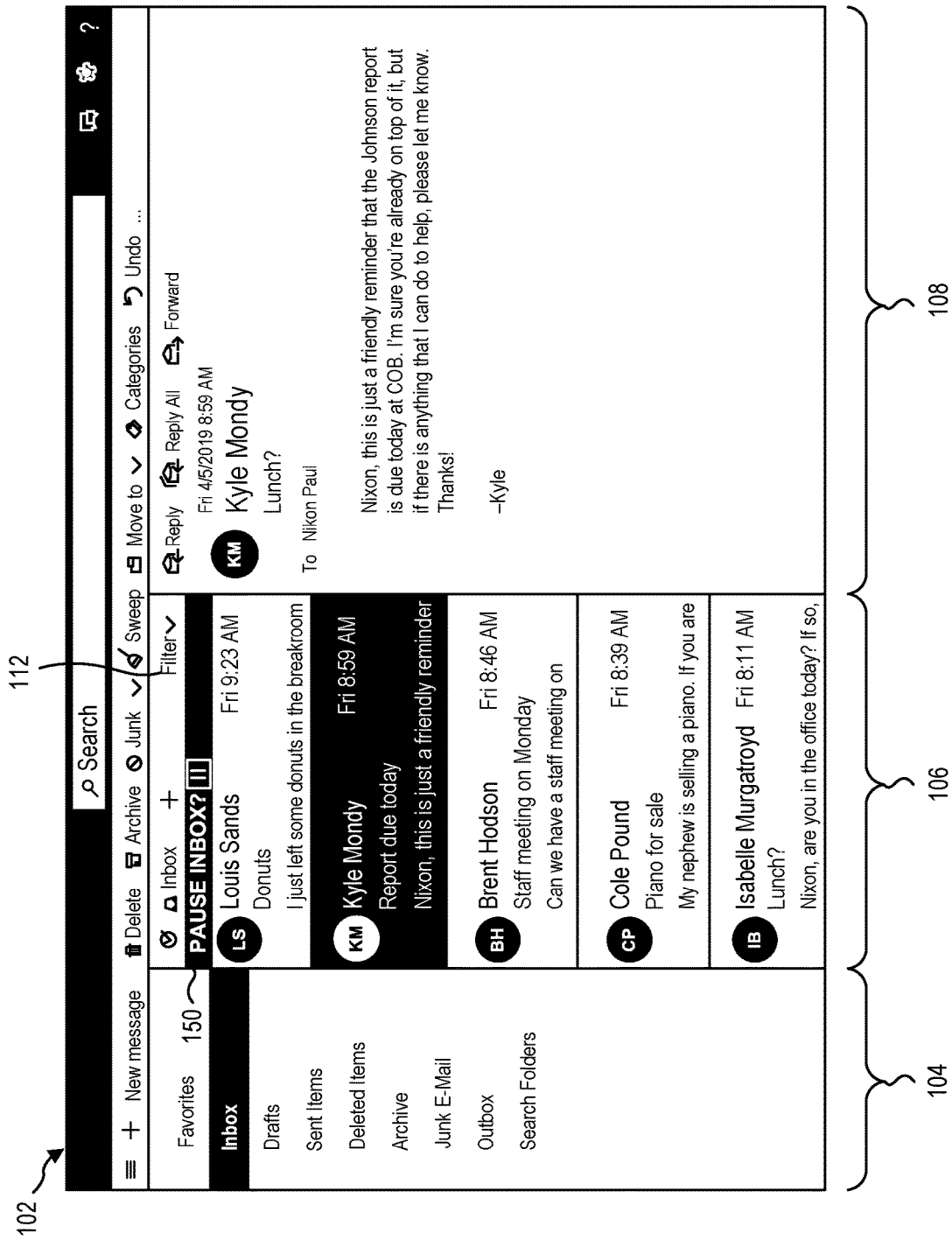
FIG. 1M illustrates an example in which the email client displays a suggestion to enter the inbox pause mode.

FIG. 1M illustrates an example in which the email client displays a suggestion 150 to enter the inbox pause mode. In the depicted example, the suggestion 150 is displayed at the top of the list pane 106. In alternative embodiments, such a suggestion 150 may be displayed in a different location in the user interface 102. The decision to present such a suggestion 150 to the user may be based on factors such as how many email messages are in the user's inbox, whether the user currently has something scheduled on his or her calendar, how many items are included on the user's to-do list, and so forth. Machine learning techniques may be utilized to determine when to make a suggestion to enter the inbox pause mode and/or to exit the inbox pause mode.

Figure 2:
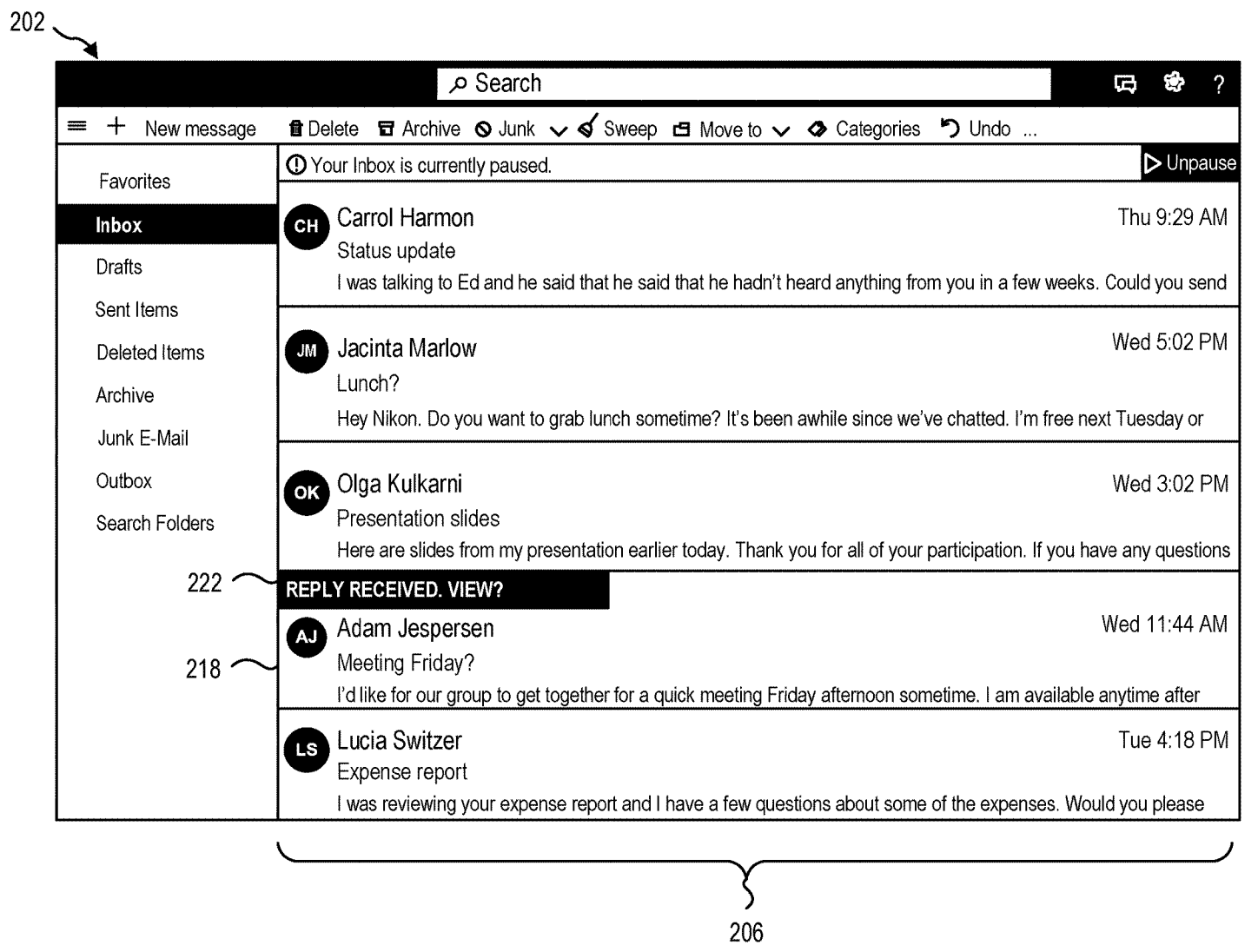

FIG. 2 illustrates an example showing how the user may be notified about an email message that is received after the email client has been placed in the inbox pause mode in a user interface 202 that does not include a reading pane. As in the example discussed previously in connection with FIG. 1C, the user receives an email message 218 that is sent to multiple people, including the user. Because this email message 218 is received before the email client enters the inbox pause mode, this email message 218 is included in the list of email messages that is displayed in the list pane 206. After the email client enters the inbox pause mode, another recipient of this email message (i.e., someone other than the user of the email client) replies to the email message 218. Because the reply message is received after the email client has entered the inbox pause mode, the reply message is not included in the list of email messages that is displayed in the list pane 206. In the depicted example, a notification 222 is displayed next to the previously received email message 218 indicating that a reply to the previously received email message 218 has been received and giving the user an opportunity to choose to view the reply. If the user chooses to view the reply, there are several different ways that at least some of the content of the reply may be displayed to the user. For example, the reply may be added to the list of email messages that is displayed in the list pane 206, displayed in a pop-up window, etc.

Figure 3:
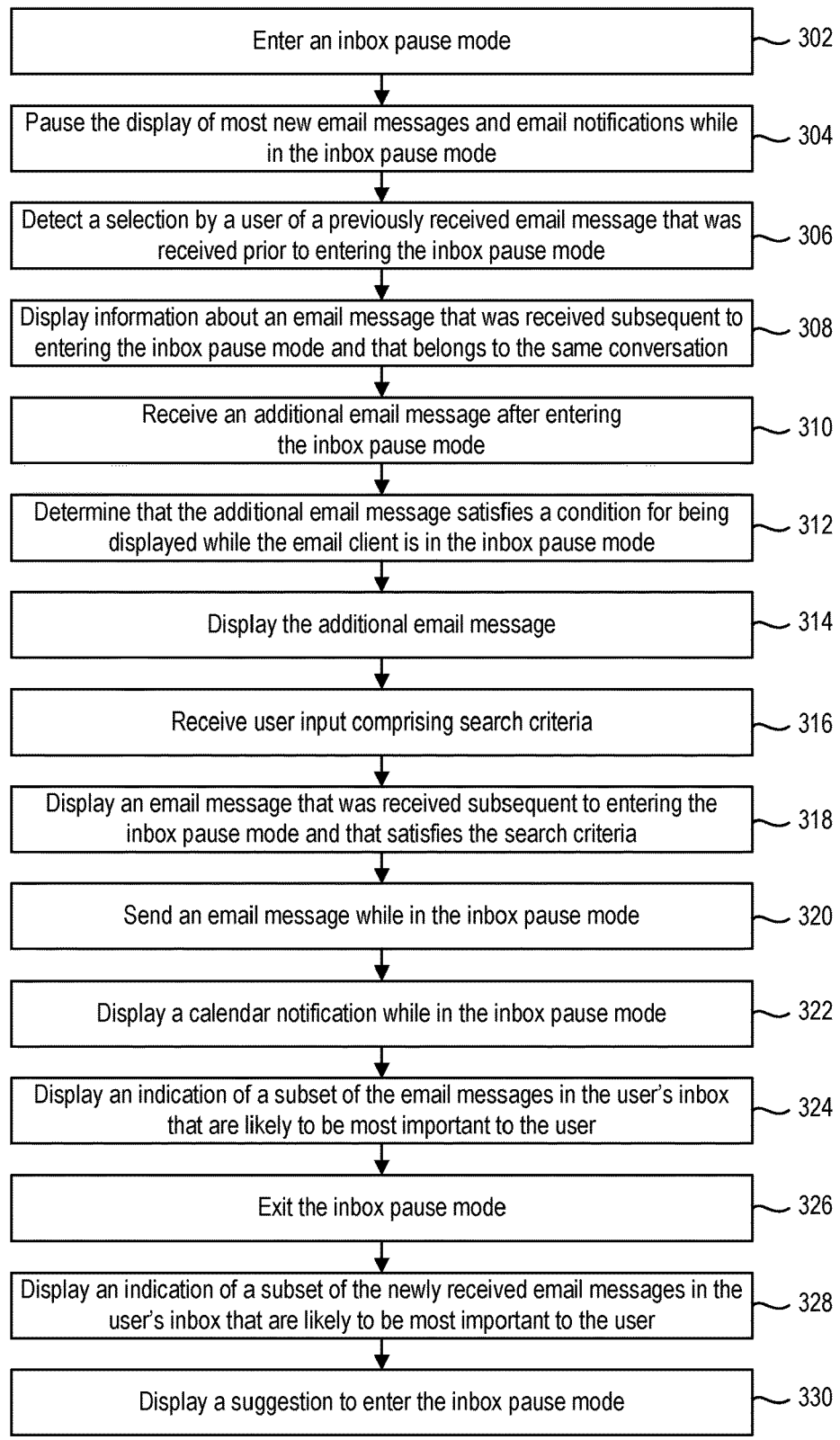
FIG. 3 illustrates a method for facilitating focused use of an email client in accordance with the present disclosure.

FIG. 3 illustrates a method 300 for facilitating focused use of an email client in accordance with the present disclosure. The steps of the method 300 may be performed by an email client. For the sake of clarity, at least some aspects of the method 300 will be described in relation to the examples that have been discussed previously. However, the scope of the present disclosure should not be limited to these particular examples.

Step 302 of the method 300 involves entering an inbox pause mode. The inbox pause mode may be entered in response to user input. The user may provide this input via a user interface element (e.g., the drop-down menu 110 shown in FIG. 1A).

Step 304 of the method 300 involves pausing display of most new email messages and email notifications while in the inbox pause mode. New email messages may continue to be delivered as they normally would be, but the email client does not immediately display most new email messages or notifications about new email messages while in the inbox pause mode.

As discussed above, however, the user may be informed about new email messages under some circumstances, so that the user does not miss out on information that would be important to the user while the email client is operating in the inbox pause mode. Steps 306 and 308 represent one example in which this may occur.

Step 306 of the method 300 involves detecting, while in the inbox pause mode, a selection by a user of a previously received email message 118 that was received prior to entering the inbox pause mode. The user's selection of the previously received email message 118 may be, for example, for the purpose of reading the email message 118 and/or for the purpose of replying to the email message 118.

Step 308 of the method 300 involves displaying, while in the inbox pause mode, information about an email message 120 that was received subsequent to entering the inbox pause mode and that belongs to the same conversation as the previously received email message 118. For example, the previously received email message 118 may be addressed to multiple people, including the user. After the email client enters the inbox pause mode, another recipient of this email message (i.e., someone other than the user of the email client) may reply to the email message 118. Because the reply message 120 is received after the email client has entered the inbox pause mode, the reply message 120 is not immediately displayed in the user interface 102 of the email client. However, in response to the user selecting the previously received email message 118 (e.g., to read the email message 118 and/or to reply to the email message 118), information about the subsequently received email message 120 may be displayed to the user. This information may be displayed automatically in response to detecting the user's selection of the previously received email message 118.

In some embodiments, the information about the subsequently received email message 120 may include at least some of the content of the subsequently received email message 120 (e.g., the sender's name, the subject line, at least part of the message body). Alternatively, the information about the subsequently received email message 120 may simply include a notification about the subsequently received email message 120 along with some type of user interface element that, if activated, causes at least some of the content of the subsequently received email message 120 to be displayed.

In the example discussed previously in connection with FIGS. 1C-D, the previously received email message 118 is included in a list of email messages that is displayed in a list pane 106 of the user interface 102, and the information about the subsequently received email message 120 is displayed in a reading pane 108 of the user interface 102. However, the scope of the present disclosure should not be limited in this regard. In some embodiments, the user interface of the email client may not have a reading pane 108, in which case the information about the subsequently received email message 120 may be displayed elsewhere within the user interface. As just one example, the information about the subsequently received email message 120 may take the form of a notification that is displayed in relation to the previously received email message 118.

Steps 306 and 308 represent one possible scenario in which the user may be notified about an email message 120 that is received after the email client has been placed in the inbox pause mode, namely, when a reply 120 to an existing email message 118 is received after the email client enters the inbox pause mode. As described above, however, there are many other possible scenarios in which the user may be notified about an email message that is received after the email client has been placed in the inbox pause mode.

Step 310 of the method 300 represents receiving an additional email message after entering the inbox pause mode. Step 312 represents determining that the additional email message satisfies a condition for being displayed while the email client is in the inbox pause mode. Step 314 represents displaying the additional email message.

Several different types of conditions may be defined that permit an email message that is received when the email client is operating in the inbox pause mode to be displayed. As one example of such a condition, the email client may be configured to display an email message that is received when the email client is operating in the inbox pause mode if the email message is related to a project on which the user is currently working. Thus, step 312 may represent determining that the additional email message is related to a project on which the user is currently working.

As another example of such a condition, the email client may be configured to display an email message that is received when the email client is operating in the inbox pause mode if the email message is associated with an urgent priority level. Thus, step 312 may represent determining that the additional email message is associated with an urgent priority level.

As another example of such a condition, the email client may be configured to display an email message that is received when the email client is operating in the inbox pause mode if the sender of the email message is included in a favorites list. Thus, step 312 may represent determining that the sender of the additional email message is included in a favorites list.

As another example of such a condition, the email client may be configured to display an email message that is received when the email client is operating in the inbox pause mode if the email message was previously "snoozed." Thus, step 312 may represent determining that the additional email message was initially received prior to entering the inbox pause mode and then scheduled to be redelivered at a time that occurs subsequent to entering the inbox pause mode.

As discussed above, email messages that are received while the email client is operating in the inbox pause mode may be displayed if they are included in search results. Step 316 involves receiving user input comprising search criteria. Step 318 represents displaying an email message that was received subsequent to entering the inbox pause mode and that satisfies the search criteria.

As also discussed above, while operating in the inbox pause mode, the user is permitted to use most of the features of the email client as the user normally would. Step 320 of the method 300 involves sending an email message while in the inbox pause mode. Step 322 of the method 300 involves displaying a calendar notification while in the inbox pause mode.

As also discussed above, when the email client enters the inbox pause mode, a determination may be made about which email messages in the user's inbox are likely to be most important to the user. Step 324 involves displaying an indication of a subset of the email messages in the user's inbox that are likely to be most important to the user. In some embodiments, step 324 may involve moving the email messages in the subset to the top of the list of email messages that are displayed in the list pane 106.

Step 326 involves exiting the inbox pause mode. The user may manually exit the inbox pause mode, in which case step 326 involves receiving additional user input. Alternatively, if in step 302 the inbox pause mode was entered for a predefined time period, then step 326 involves automatically (without additional user input) exiting the inbox pause mode after the predefined time period has elapsed.

When the email client exits the inbox pause mode in step 326 and returns to a normal mode of operation, all of the email messages that were received while the email client was in the inbox pause mode may be displayed in the user's inbox. Step 328 involves displaying an indication of a subset of the newly received email messages in the user's inbox that are most likely to be important to the user. In some embodiments, step 328 may involve moving the email messages in the subset to the top of the list of email messages that are displayed in the list pane 106.

Step 330 involves displaying a suggestion to enter the inbox pause mode. Such a suggestion may be displayed sometime when the email client is not currently operating in the inbox pause mode. For example, such a suggestion may be displayed before the user enters the inbox pause mode for the first time. As another example, such a suggestion may be displayed after a certain amount of time has elapsed since the email client was previously operating in the inbox pause mode. As noted above, the decision to present such a suggestion to the user may be based on factors such as how many email messages are in the user's inbox, whether the user currently has something scheduled on his or her calendar, how many items are included on the user's to-do list, and so forth.

Figure 4:
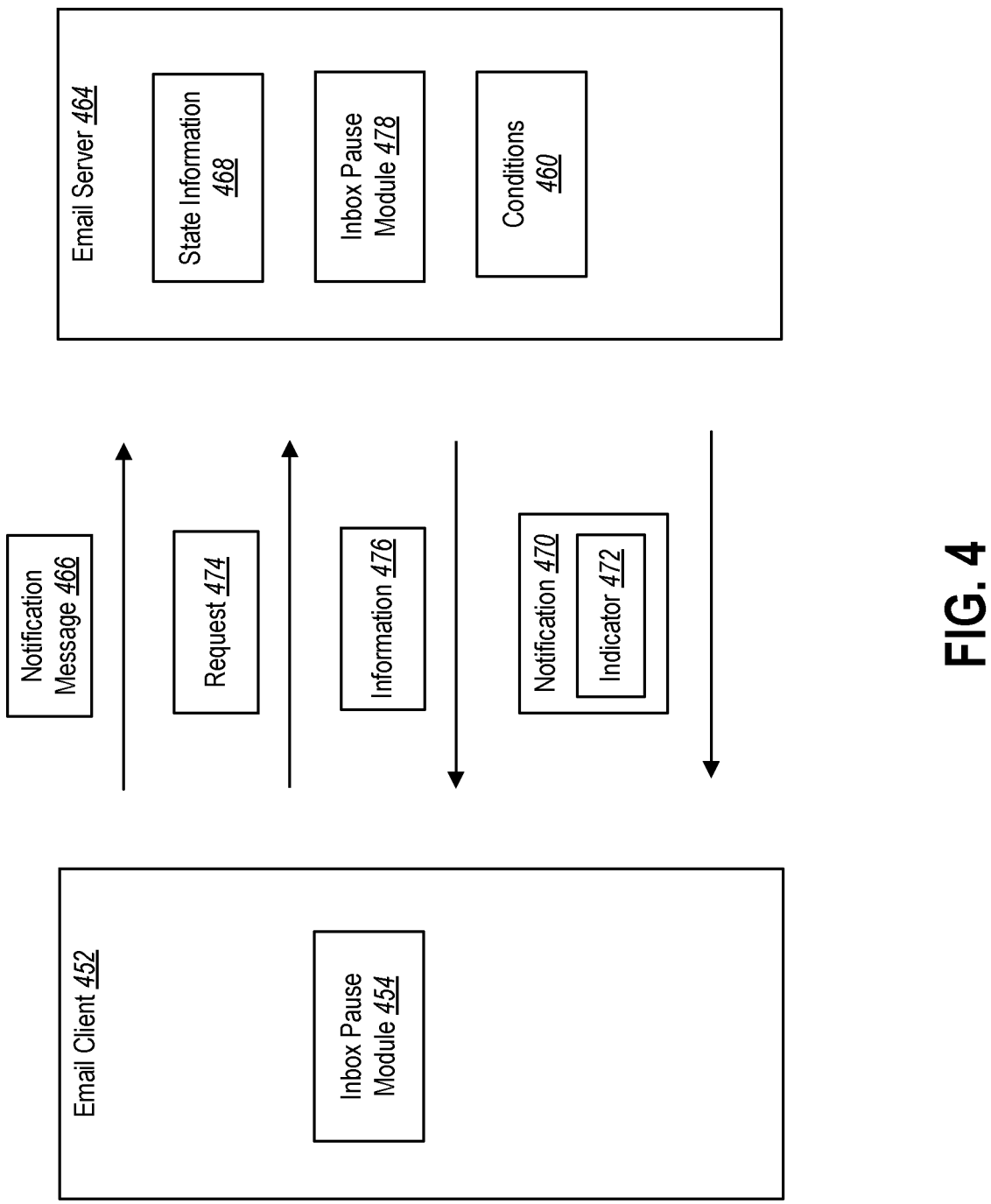
FIG. 4 illustrates an example of an email client that is configured to implement an inbox pause mode as disclosed herein in electronic communication with an email server.

FIG. 4 illustrates an example of a system 400 that includes an email client 452 that is configured to implement an inbox pause mode as disclosed herein. The email client 452 includes an inbox pause module 454 that is configured to provide this feature. The email client 452 is in electronic communication with an email server 464. The email server 464 is also shown with an inbox pause module 478. The inbox pause module 478 may be configured to perform various operations that help to implement the inbox pause mode on the email client 452.

In some embodiments, the inbox pause module 454 may be configured so that whenever the inbox pause module 454 causes the email client 452 to enter (or exit) the inbox pause mode, the inbox pause module 454 notifies the email server 464 about this change. FIG. 4 shows the email server 464 receiving a notification message 466 from the email client 452. The notification message 466 notifies the email server 464 that the email client 452 has entered (or exited) the inbox pause mode.

The email server 464 maintains state information 468 about the email client 452. In response to being notified that the email client 452 has entered the inbox pause mode, the inbox pause module 478 on the email server 464 may modify the state information 468 associated with the email client 452. The state information 468 may indicate, among other things, whether the email client 452 is in the inbox pause mode. If the email client 452 is in the inbox pause mode, the state information 468 may also indicate what time the email client 452 entered the inbox pause mode.

The inbox pause module 478 on the email server 464 may use the state information 468 when the email server 464 responds to requests from the email client 452 while the email client 452 is in the inbox pause mode. As just one example, suppose that the user selects a particular type of filter to be applied to email messages in the user's inbox (e.g., a filter that causes only the unread messages to be displayed). In response to this type of user input, the email server 464 may receive a request 474 from the email client 452 to apply the requested filter. The email server 464 may respond to the request 474 with information 476 about email messages whose characteristics satisfy the requirements of the filter. For example, if the user has selected a filter that causes only unread messages to be displayed, then the information 476 that is provided in response to the request 474 may include information about the unread email messages in the user's inbox. As part of responding to the request 474 from the email client 452, the email server 464 may refer to the state information 468. For example, the email server 464 may refer to the state information 468 to determine whether or not the email client 452 is in the inbox pause mode. If the email client 452 is in the inbox pause mode, the email server 464 may also refer to the state information 468 to determine what time the email client 452 entered the inbox pause mode. The email server 464 may also ensure that the information 476 that is provided in response to the request 474 does not include any information about email messages that were received after the time that the email client 452 entered the inbox pause mode.

The email server 464 may send notifications to the email client 452 about new email messages that have been received. When the email client 452 is in the inbox pause mode, the email client 452 may temporarily ignore at least some of these notifications.

As discussed above, however, the techniques disclosed herein also allow the user to be informed about new email messages under some circumstances, even when the email client 452 is operating in the inbox pause mode. In some embodiments, the email server 464 may be configured to facilitate this by modifying at least some of the notifications that are sent to the email client 452. For example, the email server 464 may be aware of one or more conditions 460 that permit a new email message to be displayed even when the email client 452 is operating in the inbox pause mode. When a new email message is received when the email client 452 is in the inbox pause mode and such a condition 460 is satisfied, the inbox pause module 478 may cause the email server 464 to include an indicator 472 in a notification 470 that is sent to the email client 452 about the newly received email message. The presence of the indicator 472 may signal to the email client 452 that the notification 470 should be processed even when the email client 452 is in the inbox pause mode.

Figure 5:
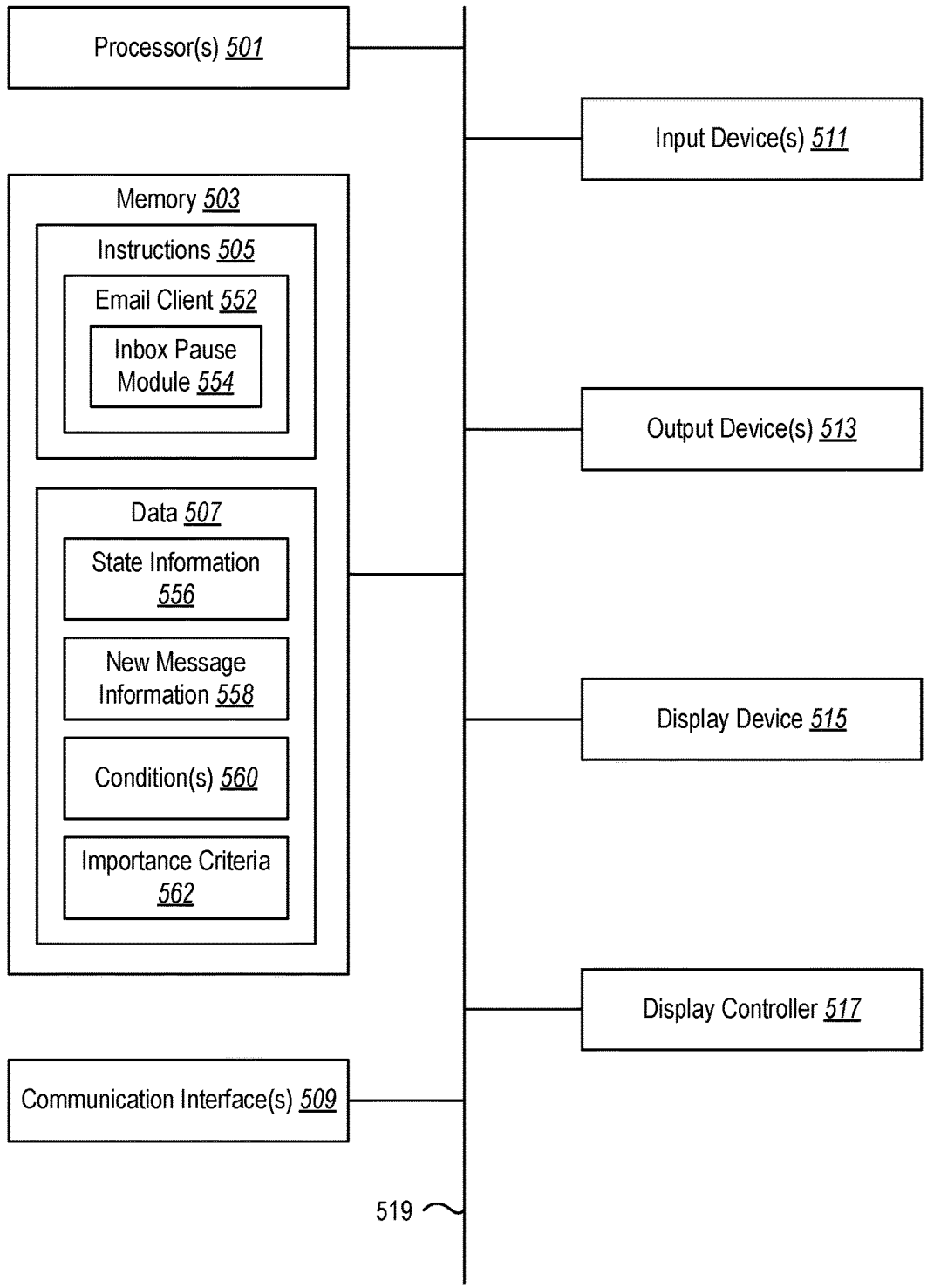
FIG. 5 illustrates certain components that may be included within a computing device in accordance with the present disclosure.

As discussed above, the techniques disclosed herein facilitate focused use of an email client. An email client is a software program that runs on a computing device. FIG. 5 illustrates certain components that may be included within a computing device 500 in accordance with the present disclosure.

As used herein, the term "computing device" refers to any electronic equipment that includes memory and a processor that is configured to follow instructions stored in the memory to perform sequences of mathematical and logical operations. Some examples of computing devices that may be used in connection with the disclosed embodiments include desktop computers, laptop computers, smartphones, tablet computers, and smartwatches.

The computing device 500 includes a processor 501. The processor 501 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 501 may be referred to as a central processing unit (CPU). Although just a single processor 501 is shown in the computing device 500 of FIG. 5, in an alternative configuration, a combination of processors (e.g., an ARM and DSP) could be used.

The computing device 500 also includes memory 503 in electronic communication with the processor 501. The memory 503 may be any electronic component capable of storing electronic information. For example, the memory 503 may be embodied as random access memory (RAM), read-only memory (ROM), magnetic disk storage media, optical storage media, flash memory devices in RAM, on-board memory included with the processor 501, erasable programmable read-only memory (EPROM), electrically erasable programmable read-only memory (EEPROM) memory, registers, and so forth, including combinations thereof.

Instructions 505 and data 507 may be stored in the memory 503. The instructions 505 may be executable by the processor 501 to implement some or all of the methods, steps, operations, actions, or other functionality that is disclosed herein in connection with the computing device 500. For example, the instructions 505 may be executable by the processor 501 to implement an inbox pause mode as disclosed herein. Executing the instructions 505 may involve the use of the data 507 that is stored in the memory 503. Unless otherwise specified, any of the various examples of modules and components described herein may be implemented, partially or wholly, as instructions 505 stored in memory 503 and executed by the processor 501. Any of the various examples of data described herein may be among the data 507 that is stored in memory 503 and used during execution of the instructions 505 by the processor 501.

The instructions 505 in the memory 503 may include one or more software programs, such as an email client 552. The email client 552 may include an inbox pause module 554. The inbox pause module 554 may be configured to implement an inbox pause mode as disclosed herein. In some embodiments, the inbox pause module 554 may be a native component of the email client 552 (rather than a plug-in, for example).

The data 507 in the memory 503 may include various pieces of information that may be used by the inbox pause module 554 to implement the inbox pause mode. For example, the data 507 may include state information 556. The state information 556 may indicate, among other things, whether or not the email client 552 is operating in the inbox pause mode. The state information 556 may also include information about the state of the user's inbox when the inbox pause mode is entered (e.g., which email messages are in the user's inbox, which email messages are unread).

As another example, the data 507 may include information 558 about new email messages that are received when the email client 552 is operating in the inbox pause mode. This new message information 558 may be used along with the state information 556 to determine when information about a new email message that is received after entering the inbox pause mode is part of the same conversation as an email message that was received before entering the inbox pause mode.

The data 507 may also include information about one or more conditions 560 that permit an email message that is received when the email client is operating in the inbox pause mode to be displayed. Several examples of such conditions 560 were described above (e.g., whether an email message is related to a project on which the user is currently working, whether an email message is associated with an urgent priority level, whether the sender of the additional email message is included in a favorites list, whether the email message was previously "snoozed").

The data 507 may also include information about criteria 562 that may be used to determine whether an email message is likely to be important to the user. These criteria 562 may be referred to herein as importance criteria 562. The importance criteria 562 may be used when the email client 552 enters the inbox pause mode (as described above in connection with FIG. 1K, for example) and/or when the email client 552 exits the inbox pause mode (as described above in connection with FIG. 1L, for example).

The computing device 500 may also include one or more communication interfaces 509 for communicating with other electronic devices. For example, the email client 552 may use a communication interface 509 to communicate with an email server (e.g., to notify the email server that the email client 552 has entered the inbox pause mode, to receive notifications from the email server, to download email messages from the email server). The communication interface(s) 509 may be based on wired communication technology, wireless communication technology, or both. Some examples of communication interfaces 509 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computing device 500 may also include one or more input devices 511 and one or more output devices 513. A user of the computing device 500 may use one or more input devices 511 to provide user input to place the email client 552 in the inbox pause mode and/or to return the email client 552 to a normal mode of operation. Some examples of input devices 511 include a keyboard, mouse, microphone, remote control device, button, joystick, trackball, touchpad, and lightpen. One specific type of output device 513 that is typically included in a computing device 500 is a display device 515. A user interface 102 of an email client 552 may be displayed to the user via a display device 515. Display devices 515 used with embodiments disclosed herein may utilize any suitable image projection technology, such as liquid crystal display (LCD), light-emitting diode (LED), gas plasma, electroluminescence, or the like. A display controller 517 may also be provided, for converting data 507 stored in the memory 503 into text, graphics, and/or moving images (as appropriate) shown on the display device 515. The computing device 500 may also include other types of output devices 513, such as a speaker, a printer, etc.

The various components of the computing device 500 may be coupled together by one or more buses, which may include a power bus, a control signal bus, a status signal bus, a data bus, etc. For the sake of clarity, the various buses are illustrated in FIG. 5 as a bus system 519.

As noted above, an email client that is operating in the inbox pause mode may pause the display of most new email messages. In some embodiments, the term "most" means more than half. In other words, in such embodiments, most new email messages are paused if more than half of new email messages are paused (i.e., not displayed while the email client is operating in the inbox pause mode). In other embodiments, the term "most" means more than 75%. In still other embodiments, the term "most" means more than 90%.

The percentage of new email messages that are paused may be measured in relation to a time interval. For example, if more than some specified percentage (e.g., 50%) of new email messages received during a particular time interval (e.g., 10 minutes) are paused, then it may be said that most of the new email messages have been paused. In some embodiments, the time interval may be at least 10 minutes. In other embodiments, the time interval may be at least 30 minutes. In still other embodiments, the time interval may be at least 60 minutes.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A non-transitory computer-readable medium comprising instructions that are executable by one or more processors to cause an email client on a computing device to:
cause the email client to enter an inbox pause mode;
define one or more conditions that permit a new email message or a new email notification to be displayed while the email client is in the inbox pause mode;
cause the email client, while the email client is in the inbox pause mode, to pause display of all new email messages and all new email notifications except for any new email messages or any new email notifications that satisfy any of the one or more conditions, wherein the email client continues to display a plurality of previously received email messages while in the inbox pause mode, the plurality of previously received email messages being received prior to entering the inbox pause mode;
detect, while in the inbox pause mode, a selection by a user of a previously received email message that was received prior to entering the inbox pause mode;
cause, in response to the user's selection of the previously received email message, information about a subsequently received email message to be displayed while in the inbox pause mode, wherein the subsequently received email message is received subsequent to entering the inbox pause mode and belongs to a conversation comprising the previously received email message;
receive user input comprising search criteria, wherein the user input initiates a search for any email messages that satisfy the search criteria, and wherein the search is performed while the email client is in the inbox pause mode; and
cause an email message that was received subsequent to entering the inbox pause mode and that satisfies the search criteria to be displayed.

2. The non-transitory computer-readable medium of claim 1, wherein the information about the subsequently received email message comprises at least some content from the subsequently received email message.

3. The non-transitory computer-readable medium of claim 1, wherein the information about the subsequently received email message comprises a notification about the subsequently received email message.

4. The non-transitory computer-readable medium of claim 1, wherein:
the previously received email message is included in a list of email messages that is displayed in a list pane of a user interface; and
the information about the subsequently received email message is displayed in a reading pane of the user interface.

5. The non-transitory computer-readable medium of claim 1, further comprising additional instructions that are executable by the one or more processors to cause the email client to:
receive an additional email message after entering the inbox pause mode;
determine that the additional email message satisfies a condition for being displayed while the email client is in the inbox pause mode; and
cause the additional email message to be displayed.

6. The non-transitory computer-readable medium of claim 5, wherein determining that the additional email message satisfies the condition comprises determining that the additional email message is related to a project on which the user is currently working.

7. The non-transitory computer-readable medium of claim 5, wherein determining that the additional email message satisfies the condition comprises determining that the additional email message is associated with an urgent priority level.

8. The non-transitory computer-readable medium of claim 5, wherein determining that the additional email message satisfies the condition comprises determining that a sender of the additional email message is included in a favorites list.

9. The non-transitory computer-readable medium of claim 5, wherein determining that the additional email message satisfies the condition comprises determining that the additional email message was initially received prior to entering the inbox pause mode and then scheduled to be redelivered at a time that occurs subsequent to entering the inbox pause mode.

10. The non-transitory computer-readable medium of claim 1, further comprising additional instructions that are executable by the one or more processors to cause the email client to send an email message while in the inbox pause mode.

11. The non-transitory computer-readable medium of claim 1, further comprising additional instructions that are executable by the one or more processors to cause the email client to cause a calendar notification to be displayed while in the inbox pause mode.

12. The non-transitory computer-readable medium of claim 1, wherein an inbox associated with the user comprises a plurality of email messages, and further comprising additional instructions that are executable by the one or more processors to cause the email client to cause an indication of a subset of the plurality of email messages that are likely to be important to the user to be displayed.

13. The non-transitory computer-readable medium of claim 1, wherein:
the inbox pause mode is entered in response to user input; and
the non-transitory computer-readable medium further comprises additional instructions that are executable by the one or more processors to cause the email client to automatically exit the inbox pause mode after a predefined time period.

14. The non-transitory computer-readable medium of claim 1, further comprising additional instructions that are executable by the one or more processors to cause the email client to:
exit the inbox pause mode;
cause a plurality of additional email messages that were received subsequent to entering the inbox pause mode to be displayed in response to exiting the inbox pause mode; and
cause an indication of a subset of the plurality of additional email messages that are likely to be important to the user to be displayed.

15. The non-transitory computer-readable medium of claim 1, further comprising additional instructions that are executable by the one or more processors to cause the email client to cause a suggestion to enter the inbox pause mode to be displayed.

16. A method for facilitating focused use of an email client, comprising:
causing the email client to enter an inbox pause mode;

defining one or more conditions that permit a new email message or a new email notification to be displayed while the email client is in the inbox pause mode;

causing the email client, while the email client is in the inbox pause mode, to pause display all new email messages and all new email notifications except for any new email messages or any new email notifications that satisfy any of the one or more conditions, wherein the email client continues to display a plurality of previously received email messages while in the inbox pause mode, the plurality of previously received email messages being received prior to entering the inbox pause mode;

detecting, while in the inbox pause mode, a selection by a user of a previously received email message that was received prior to entering the inbox pause mode;

causing, in response to the user's selection of the previously received email message, information about a subsequently received email message to be displayed while in the inbox pause mode, wherein the subsequently received email message is received subsequent to entering the inbox pause mode and belongs to a conversation comprising the previously received email message;

receiving user input comprising search criteria, wherein the user input initiates a search for any email messages that satisfy the search criteria, and wherein the search is performed while the email client is in the inbox pause mode; and causing an email message that was received subsequent to entering the inbox pause mode and that satisfies the search criteria to be displayed.

17. The method of claim 16, further comprising:
receiving an additional email message after entering the inbox pause mode;
determining that the additional email message satisfies a condition for being displayed while the email client is in the inbox pause mode; and
causing the additional email message to be displayed.

18. The method of claim 17, wherein determining that the additional email message satisfies the condition comprises at least one of:
determining that the additional email message is related to a project on which the user is currently working;
determining that the additional email message is associated with an urgent priority level;
determining that a sender of the additional email message is included in a favorites list; or
determining that the additional email message was initially received prior to entering the inbox pause mode and then scheduled to be redelivered at a time that occurs subsequent to entering the inbox pause mode.

19. A system for facilitating focused use of an email client, comprising:
one or more processors;
memory in electronic communication with the one or more processors; and
instructions stored in the memory, the instructions being executable by the one or more processors to:
cause the email client to enter an inbox pause mode;
define one or more conditions that permit a new email message or a new email notification to be displayed while the email client is in the inbox pause mode;
cause the email client, while the email client is in the inbox pause mode, to pause display of all new email messages and all new email notifications except for any new email messages or any new email notifications that satisfy any of the one or more conditions, wherein the email client continues to display a plurality of previously received email messages while in the inbox pause mode, the plurality of previously received email messages being received prior to entering the inbox pause mode;
detect, while in the inbox pause mode, a selection by a user of a previously received email message that was received prior to entering the inbox pause mode;
cause, in response to the user's selection of the previously received email message, information about a subsequently received email message to be displayed while in the inbox pause mode, wherein the subsequently received email address is received subsequent to entering the inbox pause mode and belongs to a conversation comprising the previously received email message;
receive user input comprising search criteria, wherein the user input initiates a search for any email messages that satisfy the search criteria, and wherein the search is performed while the email client is in the inbox pause mode; and
cause an email message that was received subsequent to entering the inbox pause mode and that satisfies the search criteria to be displayed.

* * * * *